US007623278B2

(12) United States Patent
Mestha et al.

(10) Patent No.: US 7,623,278 B2
(45) Date of Patent: Nov. 24, 2009

(54) MEMS FABRY-PEROT INLINE COLOR SCANNER FOR PRINTING APPLICATIONS USING STATIONARY MEMBRANES

(75) Inventors: Lalit K. Mestha, Fairport, NY (US); Peter M. Gulvin, Webster, NY (US); Pinyen Lin, Rochester, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 466 days.

(21) Appl. No.: 11/535,382

(22) Filed: Sep. 26, 2006

(65) Prior Publication Data

US 2008/0080026 A1     Apr. 3, 2008

(51) Int. Cl.
*H04N 1/46* (2006.01)
*G06K 15/00* (2006.01)
*G01D 18/00* (2006.01)
*G06K 9/00* (2006.01)

(52) U.S. Cl. .......................... 358/504; 358/1.9; 702/85; 382/167

(58) Field of Classification Search .................. 358/504, 358/505, 512, 518, 520, 526, 530, 538, 1.9; 382/162, 167; 704/85
See application file for complete search history.

(56) References Cited

U.S. PATENT DOCUMENTS

| 5,953,114 | A * | 9/1999 | Spink et al. ............... 356/152.1 |
| 6,295,130 | B1 | 9/2001 | Sun et al. |
| 6,351,308 | B1 | 2/2002 | Mestha |
| 6,384,918 | B1 | 5/2002 | Hubble, III et al. |
| 6,538,770 | B1 | 3/2003 | Mestha |
| 6,603,551 | B2 | 8/2003 | Mestha et al. |
| 6,633,382 | B2 | 10/2003 | Hubble, III et al. |

(Continued)

FOREIGN PATENT DOCUMENTS

EP     1 288 640 A2     3/2003

OTHER PUBLICATIONS

Lalit K. Mestha, "Control Advances in Production Printing and Publishing Systems," *Proceedings of the International Conference on Digital Printing Technologies (NIP20)*, The Society for Imaging Science and Technology, Oct. 31-Nov. 5, 2004.

(Continued)

*Primary Examiner*—Madeleine A Nguyen
(74) *Attorney, Agent, or Firm*—Oliff & Berridge, PLC

(57) ABSTRACT

A Micro-Electro-Mechanical System (MEMS) based Fabry-Perot array may be used as a spectral filter to light sensing array, such as a CCD or CMOS photodetector. Applying different voltages to the electrodes of individual Fabry-Perot cells within the array allows a gradient in the Fabry-Perot air gap across the Fabry-Perot array. In this manner the MEMS Fabry-Perot array serves as a spectral filter of light passing through the Fabry-Perot array to the photodetector array. Embodiments of the disclosed sensor, used with LEDs that emit light outside the photosensitivity range of a photoreceptor belt, may be used to measure spectral information from toned patches placed upon a photoreceptor belt within a marking system. Other embodiments of the disclosed sensor, used with LEDs that emit light of any wavelength, may be used to measure spectral information from toned patches placed by a marking system upon a non-photosensitive output substrate, such as an intermediate belt or paper.

26 Claims, 16 Drawing Sheets

U.S. PATENT DOCUMENTS

| | | | |
|---|---|---|---|
| 6,690,471 | B2 | 2/2004 | Tandon et al. |
| 6,721,692 | B2 | 4/2004 | Mestha et al. |
| 6,809,855 | B2 | 10/2004 | Hubble, III et al. |
| 6,975,949 | B2 | 12/2005 | Mestha et al. |
| 6,985,233 | B2 * | 1/2006 | Tuschel et al. ............... 356/454 |
| 7,417,746 | B2 * | 8/2008 | Lin et al. ..................... 356/519 |
| 2001/0048083 | A1 * | 12/2001 | Hagiwara .............. 250/492.22 |
| 2003/0067602 | A1 * | 4/2003 | Patel et al. .................. 356/369 |
| 2004/0012844 | A1 * | 1/2004 | Ohtsuki et al. ........... 359/341.1 |
| 2004/0136013 | A1 | 7/2004 | Mestha et al. |
| 2004/0136015 | A1 | 7/2004 | Van de Capelle et al. |
| 2005/0094122 | A1 * | 5/2005 | Hagiwara et al. ............. 355/69 |
| 2005/0160092 | A1 | 7/2005 | Mestha et al. |
| 2006/0132787 | A1 | 6/2006 | Mestha et al. |
| 2006/0197966 | A1 | 9/2006 | Viturro et al. |
| 2006/0211927 | A1 * | 9/2006 | Acosta et al. ............... 600/316 |
| 2007/0153287 | A1 * | 7/2007 | Lin et al. ..................... 356/454 |
| 2007/0153288 | A1 * | 7/2007 | Wang et al. ................. 356/454 |
| 2007/0157730 | A1 * | 7/2007 | Ochiai et al. .................. 73/627 |
| 2007/0183781 | A1 * | 8/2007 | Zeng ........................... 398/85 |
| 2007/0236757 | A1 * | 10/2007 | Stewart et al. .............. 358/509 |
| 2007/0242920 | A1 * | 10/2007 | Lin et al. ....................... 385/27 |
| 2008/0106745 | A1 * | 5/2008 | Haber et al. ................ 356/519 |

OTHER PUBLICATIONS

PK Gurram et al., "Comparison of 1-D, 2-D and 3-D Printer Calibration Algorithms with Printer Drift," *IS&T's 21st International Conference on Digital Printing Technologies (NIP21)*, Baltimore, MD, Sep. 18-22, 2005.

Lalit K. Mestha et al., "Low Cost LED Based Spectrophotometer," *ICIS '06, International Congress of Imaging Science*, Rochester, New York, May 7-12, 2006.

Lalit K. Mestha et al., "Array Based Sensor to Measure Single Separation or Mixed Color (or IOI) Patches on the Photoreceptor Using MEMS Based Hyperspectral Imaging Technology," filed Sep. 25, 2006.

Lalit Keshav Mestha et al., "Color Sensor to Measure Single Separation, mixed Color or IOI patches;" filed Sep. 25, 2006.

Lalit K. Mestha et al., U.S. Appl. No. 09/566,291, "Online Calibration System for a Dynamically Varying Color Marking Device," filed May 5, 2000.

Lalit K. Mestha et al., U.S. Appl. No. 11/092,635, "Two-Dimensional Spectral Cameras and Methods for Capturing Spectral Information Using Two-Dimensional Spectral Cameras," filed Mar. 30, 2005.

R. Enrique Viturro et al., U.S. Appl. No. 11/097,727, "Online Gray Balance Method with Dynamic Highlight and Shadow Controls," filed Mar. 31, 2005.

Pinyen Lin et al., U.S. Appl. No. 11/319,276, "Fabry-Perot Tunable Filter Systems and Methods"; filed Dec. 29, 2005.

Pinyen Lin et al., U.S. Appl. No. 11/319,389, "Reconfigurable MEMS Fabry-Perot Tunable Matrix Filter Systems and Methods"; filed Dec. 29, 2005.

Lalit K. Mestha et al., U.S. Appl. No. 11/319,395, "Systems and Methods of Device Independent Display Using Tunable Individually-Addressable Fabry-Perot Membranes"; filed Dec. 29, 2005.

Lalit K. Mestha et al., U.S. Appl. No. 11/405,941, "Projector Based on Tunable Individually-Addressable Fabry Perot Filters," filed Apr. 18, 2006.

Lalit K. Mestha et al., U.S. Appl. No. 11/406,030, "Fabry-Perot Tunable Filter," filed Apr. 18, 2006.

R. Enrique Viturro et al., U.S. Appl. No. 11/428,489, "Pitch-to-Pitch Online Array Balance Calibration," filed Jul. 3, 2006.

* cited by examiner

MEMS FABRY-PEROT INLINE COLOR SCANNER FOR PRINTING APPLICATIONS USING STATIONARY MEMBRANES

CROSS-REFERENCE TO RELATED APPLICATIONS

This application is related to U.S. patent application Ser. No. 10/248,387, filed on 15 Jan. 2003, and entitled, "Systems and Methods for Obtaining a Spatial Color Profile and Calibrating a Marking System;" U.S. patent application Ser. No. 10/342,873, filed on 15 Jan. 2003, and entitled, "Iterative Printer Control and Color Balancing System and Method Using a High Quantization Resolution Halftone Array to Achieve Improved Image Quality with Reduced Processing Overhead;" U.S. patent application Ser. No. 09/566,291, filed on 5 May 2000, and entitled, "Online Calibration System for a Dynamically Varying Color Marking Device;" U.S. patent application Ser. No. 11/070,681, filed on 2 Mar. 2005, and entitled, "Gray Balance for a Printing System of Multiple Marking Engines;" U.S. patent application Ser. No. 11/097,727, filed on 31 Mar. 2005, and entitled, "Online Gray Balance Method with Dynamic Highlight and Shadow Controls;" U.S. patent application Ser. No. 11/428,489, filed 3 Jul. 2006 and entitled, "Pitch-to-Pitch Online Array Balance Calibration;" and U.S. Pat. No. 6,295,130, filed on 22 Dec. 1999, and entitled, "Structure and Method for a Microelectromechanically Tunable Fabry-Perot Cavity Spectrophotometer;" U.S. Pat. No. 6,975,949, filed on 13 Dec. 2005, and entitled, "Full Width Array Scanning Spectrophotometer;" U.S. Pat. No. 6,690,471, filed on 10 Feb. 2004, and entitled, "Color Imager Bar Based Spectrophotometer for Color Printer Color Control System;" U.S. patent application Ser. No. 11/535,385, filed 26 Sep. 2006 and entitled, "Color Sensor to Measure Single Separation, mixed Color or IOI patches;" U.S. patent application Ser. No. 11/535,400, filed 26 Sep. 2006 and entitled, "Array Based Sensor to Measure Single Separation or Mixed Color (or IOI) Patches on the Photoreceptor Using MEMS Based Hyperspectral Imaging Technology;" and U.S. patent application Ser. No. 11/016,952 filed 20 Dec. 2004 and entitled, "Full Width Array Mechanically Tunable Spectrophotometer." The disclosures of the related applications are incorporated by reference in their entirety.

BACKGROUND

This disclosure generally relates to light sensor devices for use in marking methods and systems.

This disclosure refers to "marking" as a process of producing a pattern, such as text and/or images, on substrates, such as paper or transparent plastic. A marking engine may perform the actual marking by depositing ink, toner, dye, or any other suitable marking material on the substrate. For brevity, the word "toner" will be used to represent the full range of marking materials, and is used interchangeably with the terms for other identifying materials in the full range of marking materials.

A popular marking engine is the xerographic marking engine used in many digital copiers and printers. In such a xerographic marking engine, a photoreceptor unit, such as, for example, a belt or roller, whose electrostatic charge varies in response to being exposed to light, is placed between a toner supply and the substrate. In systems including xerographic marking engines, the toner is typically an electrostatically chargeable or electrostatically attractable toner. A laser unit, bank of light emitting diodes, or other such light source, is used to expose the photoreceptor unit to light to form an image of a pattern to be printed on the photoreceptor unit. In simple, monochromatic xerographic marking engines, single color toner is electrostatically attracted to the image on the photoreceptor unit to create a toner image on the photoreceptor unit. The toner image is then transferred to the substrate from the photoreceptor unit. Different methodologies are then employed to heat-set or otherwise "fuse" the toner image onto the substrate.

In more complex systems, multiple colors of toner are applied. General categories of more complex color systems include those that are referred to as Image On Image (IOI) systems and/or tandem systems. In an IOI system, such as that shown schematically in exemplary manner in FIG. 1, the marking engine 10 includes a plurality of primary color applying units 11 that deposit toner on a photoreceptor belt 13, which includes multiple image forming areas 14, hereafter pitches 14. A first pitch 14 of the photoreceptor belt 13 receives a first toner image in a first color. The first color remains on the photoreceptor belt 13 while second (and subsequent) toner images are created by applying second (and subsequent) colors atop the first image in the same pitch 14. The first and second (and subsequent) toner images remain on the photoreceptor belt 13 and are subsequently built up on the photoreceptor belt 13. Once all of the toner images are placed on the photoreceptor belt 13, they are then transferred to a substrate, typically paper, and fused to the substrate. Furthermore, after the first pitch 14 has passed one of the color applying units 11, the next pitch 14 comes into alignment with that color applying unit 11, and the image forming process starts again in the next pitch 14.

In an embodiment of a tandem system architecture, such as that shown in exemplary manner in FIG. 2, the marking engine 20 includes multiple primary color applying units 21 that first deposit their toner on respective photoreceptor drums 22 to form toner images. These toner images are deposited on an intermediate transfer belt (ITB) 23, which includes multiple pitches 24. Each toner image is transferred onto the ITB 23 before the next toner image is formed. Like in the IOI system, the toner images are transferred to a substrate once all toner images for a given pitch have been deposited on the ITB 23.

In a variant of the tandem system shown in FIG. 2, an additional drum may be included between each photoreceptor drum 22 and the ITB 23. The additional drum accepts the toner image from the photoreceptor drum 22 and deposits it on the ITB 23. The inclusion of the additional drum aids in reducing a possibility of toner contamination by toner of one color getting into a toner source of another color due to electrostatic interaction between the toner image on the ITB 23 and the photoreceptor drum 22.

SUMMARY

Marking engines using any of the printing techniques disclosed above seek to achieve consistency and reproducibility in generated output images. One approach by which consistency and reproducibility is effected is through the use of one or more image sensors to generate reflectance values from separate toned patches periodically output by the marking engine onto the photoreceptor unit and transferred to the substrate, based on stored test data. Measured reflectance values from a toned patch on an output substrate may be compared with stored target values and a difference value calculated. These difference values may be used to generate feedback control signals to the marking engine. In response to the feedback control signal, the marking engine may automatically adjust the amount of toner of one or more colors laid within one or more of the respective pitches that comprise an image to improve image quality, consistency and reproducibility.

Despite such feedback techniques, marking engines continue to suffer from color inconsistency or instability that may affect a final image. Such color instability may be attributed to such factors as temperature, humidity, age and/or amount of use of the photoreceptor unit, age and/or use of an individual toner color, or other like environmental and/or mechanical factors.

Further, media attributes (e.g., media weight) can also affect color stability. For example, changes in media weight may result in a need to adjust fuser temperature, decurler penetration force, and acceleration profiles to achieve micron level registration tolerances.

Mechanical control systems may also contribute to color instability in certain circumstances. For example, color to color registration errors can lead to color instability. By way of example only, in some marking systems, every pixel in all four color separations is registered on a image carrier to within, approximately, 85 microns. The placement of the separations is controlled by adjusting the speed of the photoreceptor belt, ROS position, and speed and location of the servo drive rolls. Color registration marks are placed on the photoreceptor and read with special sensors to produce a completely closed loop system that may achieve 40 micron accuracy of dot placement. However, such mechanical color to color registration processes are prone to error.

Control and sensor systems intended to correct color instability are not always effective in eliminating the color instability caused by such effects. For example, printers that use hierarchical control systems with Extended Toner Area Coverage Sensors (ETACS) are often unable to provide sufficient marking engine stability for multi-separation IOI images. This is because ETAC sensors are used to measure tone development on the photoreceptor before transfer and fuse stages for three different input tone conditions, referred to, for example, as low, mid and high area coverage, resulting in a photoreceptor developability control model with 3 states. However, although ETACS may be used in such a manner to measure color of single color control patches, ETACS do not measure color of multi-separation control patches accurately.

On-paper color measurements with image sensors, and specifically spectrophotometers, were believed to constitute a fix for this problem. On-paper spectrophotometer color measurements may be performed within a marking system as an integral part of the marking system image generation process, that is, "in-line", or performed in a process separate from the marking system image generation process, that is, "off-line." Both in-line and off-line on-paper spectrophotometric measurements may be used in various forms to construct 1D gray balance calibration tone reproduction curves (TRCs) and/or 2D, 3D or 4D correction Look-Up-Tables (LUTs). These TRCs and/or LUTs may be used by a marking engine to automatically adjust the amount of toner of one or more colors laid within one or more of the respective pitches that comprise an image to improve image quality, consistency and reproducibility, as discussed above. A drawback of relying solely upon on-paper spectrophotometer measurement techniques is the inability of the marking engine to correct colors at a sufficiently high frequency, for example, every photoreceptor belt revolution, to achieve color stabilization as is supported by the hierarchical control systems discussed above.

This disclosure describes embodiments of a Micro-Electro-Mechanical System (MEMS) based Fabry-Perot array sensor, or spectrophotometer, for non-invasively measuring spectral information from toned single or multi-color control patches. Embodiments of the disclosed sensor may be used to measure spectral information from toned patches and/or images placed upon a photoreceptor unit within a marking system. Such embodiments may allow spectral information from control patches and/or images to be measured as often as every photoreceptor belt revolution, or greater, as disclosed below. Other embodiments of the disclosed sensor may be used to measure spectral information from toned patches and/or images placed by a marking system upon a non-photosensitive output substrate, such as an intermediate belt or paper.

This disclosure will generally refer to the photoreceptor unit as a photoreceptor belt. The use of the term photoreceptor belt in this manner is for ease of understanding and clarity. It should not be regarded in any way as limiting or excluding other types of photoreceptor units, such as, for example, photoreceptor drums. The frequency sought to be achieved in toned patch and/or image monitoring of such a photoreceptor belt in operation is one or more measurements per photoreceptor belt cycle, with increased measurement accuracy.

Non-filtered spectrophotometers, which may use single or multiple photo-site light sensors, provide measured reflectance values that include combined contributions from all wavelengths received by the light sensor(s). Filtered spectrophotometers may use colored filters, for example, red, blue and/or green to filter out selected bandwidths of light entering select photo-sites. In this manner, a filtered spectrophotometer provides crude spectral information, that is, a measured reflectance value for each separately filtered photo-site or each separately filtered group of photo-sites. Spectrophotometers that use such crude filtering techniques may provide a color stabilization process with more spectral information than would be possible with an unfiltered spectrophotometer. The information provided is often limited by the number of photo-site/filter combinations used. Additionally, the spectral bands for which reflectance values are provided are not dynamically configurable. Thus, the usefulness of such spectral information to the color correction process is limited.

A Fabry-Perot cavity is an optical resonating chamber formed by two parallel, highly reflecting planes. Light entering the cavity will resonate between the two mirrors. Based upon the gap distance between the two parallel mirrors, the various frequencies of light entering the Fabry-Perot cavity will constructively and destructively interfere with one another, thereby allowing only a select band of light frequencies to emerge from the cell. Therefore, a Fabry-Perot cavity may be set to pass only selected wavelengths of light by setting the gap distance between the two parallel mirrors. In this manner, a Fabry-Perot cavity may be used as a light filter.

Such a Fabry-Perot cavity may be created between a moving plate and a CCD or CMOS photodetector array. The plate may be moved using two or more electrodes that, along with a grounded plate, form a parallel-plate capacitive actuator. Applying different voltages to the electrodes allows the plate to be tilted so that there is a gradient in the Fabry-Perot air gap. Such a tilt may also be achieved through mechanical or other means. A single cell Fabry-Perot plate may be replicated and arranged in an N×M matrix of any size array, where N and M are integers.

For example, in a Fabry-Perot array sensor embodiment used to measure spectral information from a photoreceptor belt, an N×M array may be configured to span an entire width of a photoreceptor belt for any length of the photoreceptor belt desired, for example, a width of a toned patch, or the width of an image. Alternatively, the N×M array may be configured to span only a portion of the width of the photoreceptor belt, for any length of the photoreceptor belt desired, and may be physically positioned within a marking system to allow measurement of a portion of interest of the photoreceptor belt.

Further, in a Fabry-Perot array sensor embodiment used to measure spectral information from a non-photosensitive output substrate, such as an intermediate belt or paper, an N×M array may be configured to span an entire width of the non-photosensitive output substrate for any length of the output substrate desired, for example, an entire length of a paper sheet. Alternatively, the N×M array may be configured to span only a portion of the width of a non-photosensitive output substrate, for any length of the output substrate desired, and may be physically positioned within a marking system to allow measurement of a portion of interest of the output substrate.

The gaps within the individual Fabry-Perot array cells may be set so that there is a resulting slope of the cell gaps across the Fabry-Perot array, tilted either toward or away from a scan direction. For example, the moving plate can be tilted either toward or away from the scan direction, so that a range of cell gaps is created. In this manner, different sections of the Fabry-Perot array sensor may measure different portions of the spectrum of light reflected from the photoreceptor belt or non-photosensitive output substrate. Once a portion of the photoreceptor belt or output substrate has completely passed a section of such a Fabry-Perot array configured in such a manner, spectral information of toned patches or other images on the paper/photoreceptor belt may be known. A width of the spectrum across which spectral information is recorded and a resolution with which the spectral information is recorded is dependent upon the size of the N×M Fabry-Perot array and the manner in which the gaps across the array are configured.

The cells within the Fabry-Perot array may be periodically reconfigured to measure different portions of the spectrum. This allows the Fabry-Perot array sensor to be dynamically reconfigured to provide spectral information needed by a color stabilization process to more accurately stabilize color within a marking system. For example, embodiments of the Fabry-Perot array sensor may provide measured reflectance values for any number of wavelengths throughout a dynamically selectable spectral range.

Once the Fabry-Perot plates in each of the array cells are set, no further mechanical array movement is required to support reflectance measurements. Therefore, a speed at which spectral information is collected may be limited only by a sensitivity of the associated CCD or CMOS photodetector array, that is, by a time needed for the CCD or CMOS photodetector array element(s) associated with each Fabry-Perot cell or group of cells to collect sufficient light to produce an accurate measurement. Such a Fabry-Perot array may measure spectral information, for example, at marking system inline processing rates in excess of 100 pages per minute.

In the disclosed Fabry-Perot array embodiments, the width of the spectrum being measured may be increased by increasing the gap in the respective Fabry-Perot cells in the array. For example, the gap in the respective Fabry-Perot cells in a direction across the Fabry-Perot array may be increased at a fixed rate in a direction spanning the Fabry-Perot array. The larger a rate of increase in the gap across the array, the larger a section of the overall spectrum the array is configured to measure. For example, a given Fabry-Perot array configured with a relatively small rate of increase in the gap, or tilt, will measure a relatively small section of the spectrum. The greater the tilt, the greater the section of the spectral range that will be measured by the Fabry-Perot array, but at a lesser resolution. However, the Fabry-Perot array is not limited to being set with a fixed rate of change in the gaps of the respective Fabry-Perot cells across the array. The cell gaps across the Fabry-Perot array may be set in any manner desired to collect any combination of spectral information to allow a color stabilization process to resolve a color instability issue.

Non-invasive measurement of toned patches and/or images at the photoreceptor belt rotation speed invariably requires some kind of illumination. Embodiments of the disclosed sensor illuminate toned patches and/or images using one or more illumination bands that are outside of the photo-generation response range of the photoreceptor belt upon which the toned patches and/or images are placed.

A common print quality problem in xerographic printing results from a build-up of residual potential and surface voltage on photoreceptors. Such a condition results in a vestigial image repeated at regular intervals down the length of a page and appearing as light or dark areas (in black and white printers) or often colored area in (color printers) relative to the surrounding field, referred to as ghosting. There are many sources of ghosting. Subsystems from charging, development, photoreceptor, to fusing can all produce ghosting.

Photo-generation of charge carriers in a photoreceptor belt takes place at the bottom of a charge generation layer when the photoreceptor belt is exposed with photons. The charge generation layer has photoconduction material that generates electron-hole pairs in response to the photons. These charges drift and migrate to the top surface, and neutralize the surface charges in the illuminated areas to form latent electrostatic images when the photoreceptor belt is exposed with images or toned patches. The strength of the photo generation response depends on a wavelength of the photons.

FIG. 3 presents a graphical plot 30 of the spectral sensitivity of an exemplary photoreceptor belt used in an exemplary marking engine. As shown in FIG. 3, photo generation of the photoreceptor belt has minimum electron-hole pair generation at ~470 nm and above 900 nm (infrared). Threshold line 32 marks an exemplary threshold below which ghosting is not observed in subsequent toned patches and/or images.

Therefore, exemplary embodiments of the disclosed Fabry-Perot array sensor may illuminate patches on the photoreceptor belt using illumination bands centered at ~470 nm and above 900 nm, without affecting the charge generation layer of the photoreceptor belt. In this manner, the patches on a photoreceptor belt may be illuminated and a corresponding reflected light response measured, without introducing ghost images.

Exemplary Fabry-Perot array sensor embodiments used to measure color reflectance from a non-photosensitive output substrate, such as an intermediate belt or paper, are not limited in the use of illumination bands. Therefore, in such exemplary Fabry-Perot array sensor embodiments, any number of illumination wavelengths may be used, even white light, that is, light that includes all wavelengths.

Fabry-Perot array sensor embodiments configured to measure spectral information from a photoreceptor substrate, as well as embodiments configured to measure spectral information from an output substrate, may illuminate the respective substrate using Low Cost Light Emitting Diode (LCLED) technology. The LEDs selected may be based upon the photosensitive characteristics of the particular substrate.

In Fabry-Perot array sensor embodiments used to measure spectral information from a photoreceptor substrate, LCLEDs that emit light centered at wavelengths outside the photo response range of the photoreceptor belt may be used, as discussed above. In Fabry-Perot array sensor embodiments used to measure spectral information from a non-photosensitive output substrate, LCLEDs that emit light at wavelengths throughout the spectrum may be used.

Exemplary embodiments of the disclosed Fabry-Perot array sensor may be used to measure spectral information from a non-photosensitive output substrate and may use, for example, 8 LED illuminators, centered at ~437 nm, ~468 nm, ~507 nm, ~523 nm, ~573 nm, ~596 nm, ~626 nm, respectively. However, in the case of Fabry-Perot array sensor embodiments used to measure spectral information from patches on a photoreceptor belt, with a photo generation response discussed above, for example, with respect to FIG. 3, LEDS may be selected that illuminate at wavelengths centered at wavelengths for which photo generation of the photoreceptor belt has minimum electron-hole pair generation.

Exemplary embodiments of such Fabry-Perot array sensors may sequentially illuminate toned patches and/or images with LEDs at specific wavelengths, such as: (1) one or more LEDs that produce a narrow illumination band centered at a wavelength within a first low photosensitivity region of the photoreceptor belt, for example, below 525 nm, such as an LED that produces a narrow illumination band centered around 470 nm; and (2) one or more LEDs that produce a narrow illumination band centered at a wavelength within a second low photosensitivity region of the photoreceptor belt, for example, above 900 nm, such as an LED that produces a narrow illumination band centered around 940 nm and/or an LED that produces a narrow illumination band centered around 970 nm.

Disclosed Fabry-Perot array sensors may be configured to measure light reflectance from toned patches of colors throughout the color gamut, either on the photoreceptor or on an output substrate, and to generate measured spectral information that may be used to characterize the toned patch. The measured spectral information may be compared with a set of desired spectral information and used to produce and/or update a color correlating tone reproduction curve (TRC) and/or a look-up table (LUT). The TRCs and/or LUTs may then be used to alter a theoretical combination of toner to produce more accurate color with an actual combination.

For example, if one desires a process color of 128 cyan, 64 magenta, 64 yellow, and 0 black, but the marking engine used must employ 131 cyan, 67 magenta, and 69 yellow, and 0 black to achieve the desired result, TRCs may be employed to adjust the requested color amounts so that the marking engine deposits 131 cyan, 67 magenta, 69 yellow, and 0 black, yielding the desired process color. Preferably, a different TRC may be used for each toner that a marking engine uses. For example, a CMYK marking engine may include four TRCs. TRCs may include different ranges of saturation values, such as 0 to 1, 0 to 100, or 0-255. Regardless of input and output ranges, all TRCs may be used to adjust an amount of toner deposited by mapping an input value to an output value.

Exemplary embodiments of disclosed Fabry-Perot array sensors, using illumination bands outside the photosensitivity range of a photosensitive substrate, may be configured to support multi-axis control color control of a marking engine at a frequency, for example, every photoreceptor belt cycle or greater, that is higher than an update frequency possible with on-paper measurements. Embodiments of Fabry-Perot array sensors for measuring spectral reflectance information, or spectral information, from non-photosensitive substrates, using multiple simultaneous illumination bands, may also be configured to support multi-axis color control. In such on-paper systems, new measurements may only be taken each time a new output substrate is generated, which typically requires multiple photoreceptor belt cycles.

An exemplary color stabilization process may use measured spectral information received from one or more Fabry-Perot array sensor embodiments. For example, a color stabilization process may receive measured spectral information from one or more Fabry-Perot array sensor embodiments that measure spectral information from toned patches and/or images on a photoreceptor belt, as well as one or more Fabry-Perot array sensor embodiments that measure spectral information from toned patches and/or images on a non-photosensitive output substrate. In this manner, an exemplary color stabilization process may obtain and make use of spectral information available from photoreceptor-based toned patch and/or image reflections and/or paper-based toned patch and/or image reflections, thereby maximizing spectral information available to support the color stabilization process.

Exemplary Fabry-Perot array sensor embodiments may be used to measure single-color, mixed-color and/or IOI patches to enable multi-axis color control of a wide range of marking engines. Further, a relatively low cost of such an approach may allow color control features, previously reserved for only high-end printing systems, to be considered for use in less expensive printing systems.

These and other objects, advantages and salient features are disclosed in or apparent from the following description of exemplary embodiments.

BRIEF DESCRIPTION OF THE DRAWINGS

Exemplary embodiments will be disclosed with reference to the accompanying drawings, in which like numerals represent like parts, and wherein.

DETAILED DESCRIPTION OF EMBODIMENTS

Figure 1:
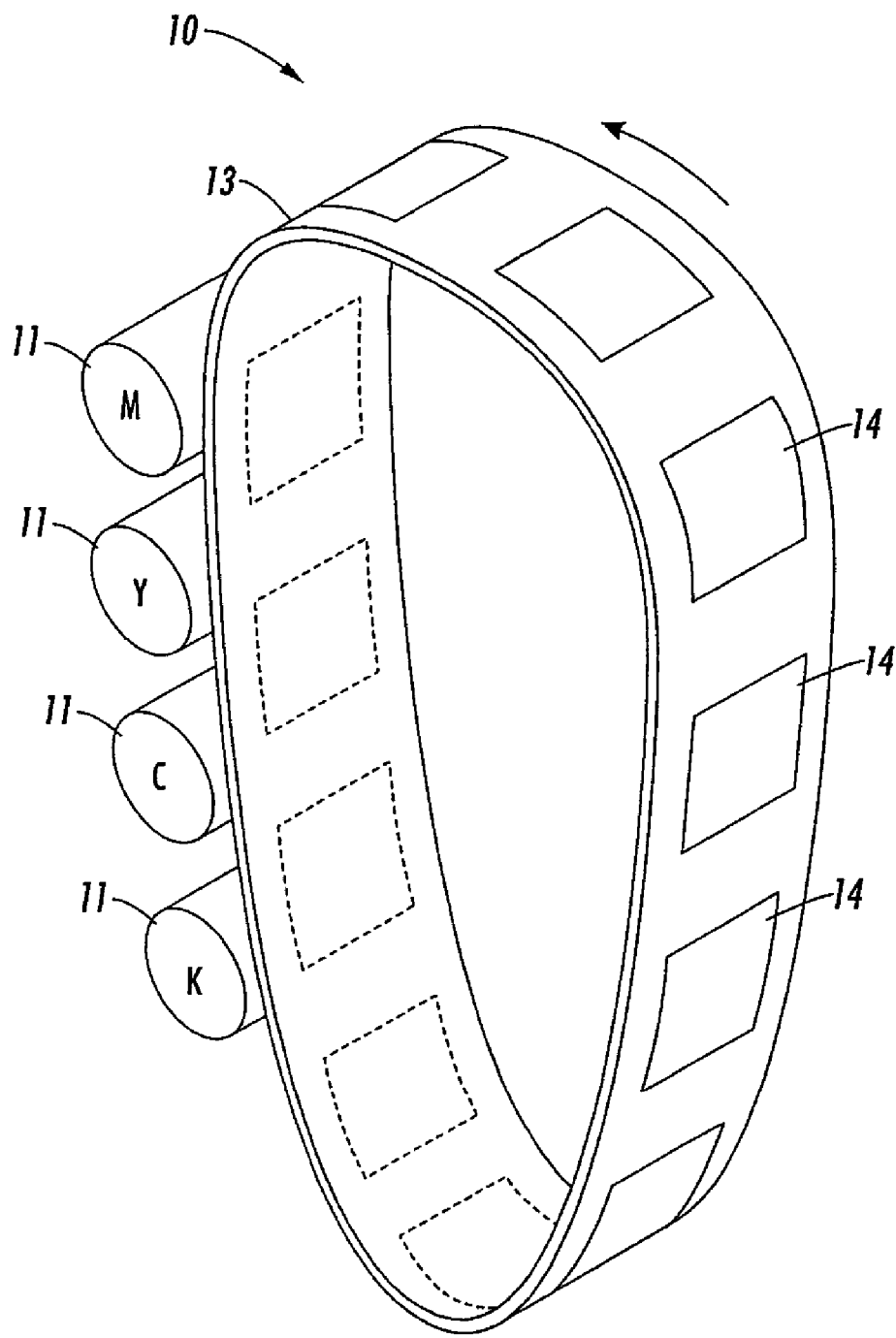
FIG. 1 schematically illustrates an Image On Image (IOI) marking engine showing multiple pitches on a photoreceptor belt.
Figure 2:
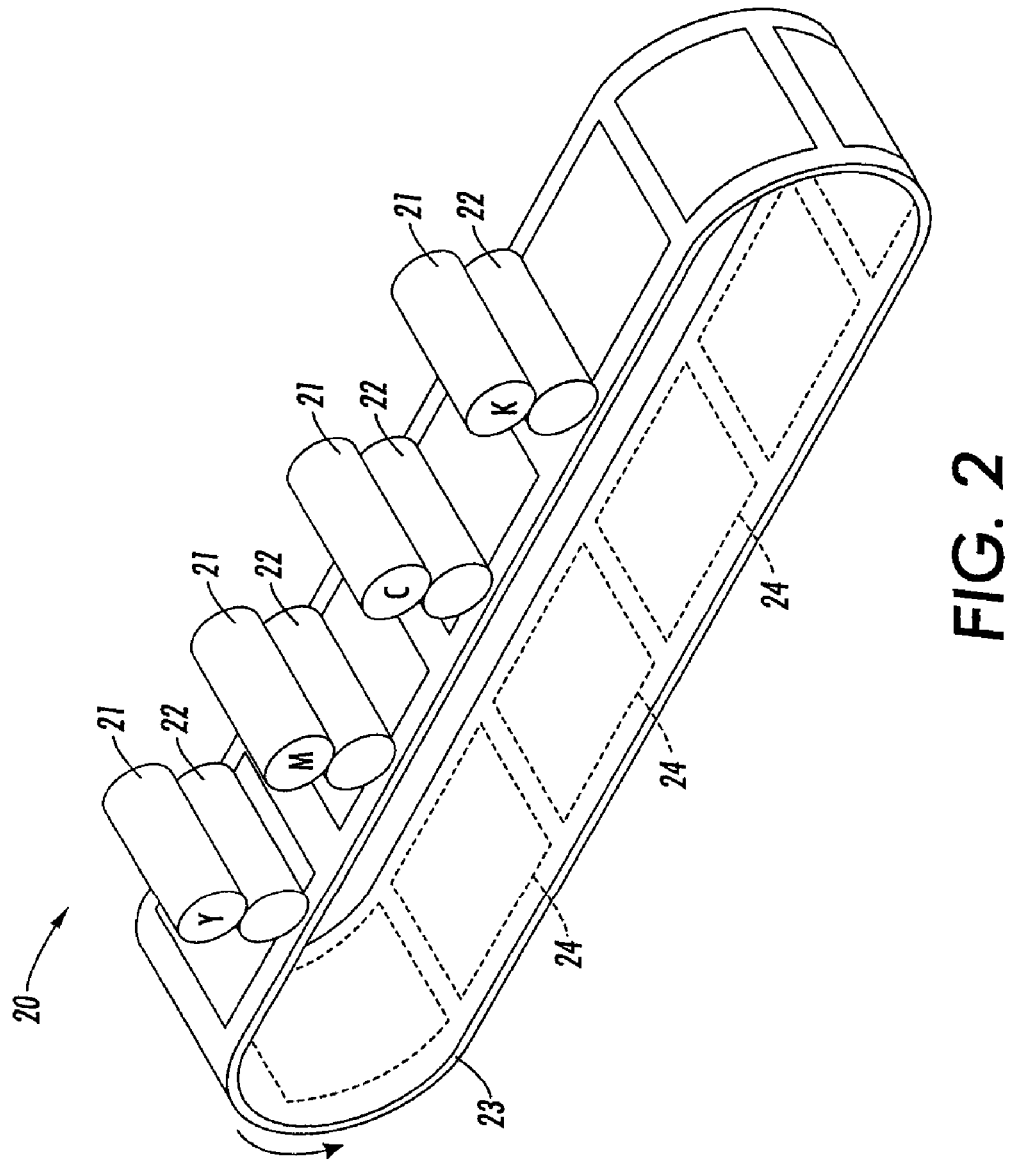
FIG. 2 schematically illustrates a tandem marking engine showing multiple pitches on an intermediate transfer belt (ITB)

To obtain a desired color on a target media, such as white paper, different amounts of base colors or marking materials, such as cyan, magenta and yellow, are marked on a photoreceptor unit or belt in preparation for transfer to the target media. A well-balanced marking engine should produce a pitch with color reflectance values which, when measured, match reflectance values that correspond to the desired color. However, a marking engine may not produce an exact desired color due to, among other factors, variations in color pigments of the primary colors used by the marking engine, and/or internal processes of the marking engine. To overcome such shortfalls, color balance TRCs may be developed by iterative methods, such as those described above, and as disclosed in U.S. patent application Ser. Nos. 09/566,291, 11/070,681 and 11/097,727. These TRCs may be employed to, for example, adjust amounts of cyan, magenta and yellow proportions for all color tone values, taking into account the state of the materials and the marking engine. This approach can be extended to produce color balanced and/or gray balanced TRCs for spatial uniformity corrections as disclosed, for example, in U.S. patent application Ser. Nos. 10/248,387 and 10/342,873.

Iterative methods disclosed above to produce accurate TRCs may rely upon feedback in the form of measured reflectance values from toned patches output by the marking engine in response to a set of predetermined, often stored, toned patch pattern data. By comparing measured spectral information from a toned patch with a stored set of desired spectral information previously generated for the toned patch, TRCs may be created and/or updated. The new or updated TRCs may then be used by the marking engine to adjust and stabilize color output. However, measured reflectance values provided by the spectrophotometers used in the above processes includes limited spectral information, as discussed above.

Calibration and control methodologies disclosed above may be used to achieve high quality and consistent color balanced printing for marking engines with periodic pitch-to-pitch variations. To counter the effects of such factors as temperature, humidity, the age and/or amount of use of the photoreceptor belt, age and/or use of an individual toner color and other such related factors, TRCs are preferably continuously updated based upon measured spectral information that is measured one or more times during a single revolution of a marking system's photoreceptor belt. As discussed above, exemplary embodiments of disclosed Fabry-Perot array sensor devices can provide improved spectral information in support of such color stabilization processes. One exemplary embodiment may obtain improved spectral information from toned patches and/or images on a photoreceptor belt within a marking system, allowing spectral information to be collected each revolution, without introducing ghost images upon the photoreceptor belt. Another exemplary embodiment may obtain spectral information from toned patches and/or images on a non-photosensitive output substrate, such as an intermediate belt or paper.

The basic structure of a Fabry-Perot cavity spectrophotometer is disclosed in detail in U.S. Pat. No. 6,295,130, and co-pending application U.S. patent application Ser. No. 11/092,635, which are incorporated herein by reference in their entirety. The basic Fabry-Perot cavity includes two micro-mirrors separated by a gap. The gap may be an air gap, or may be filled with liquid or other material. The micro-mirrors may include multi-layer distributed Bragg reflector (DBR) stacks or highly reflective metallic layers, such as gold. A voltage applied between the two mirrors may be adjusted to change the distance between the two mirrors. The distance between the two mirrors may be referred to as the gap distance. Only light with certain wavelength may be able to pass the gap due to interference effect of incident light and reflective light.

Figure 4:
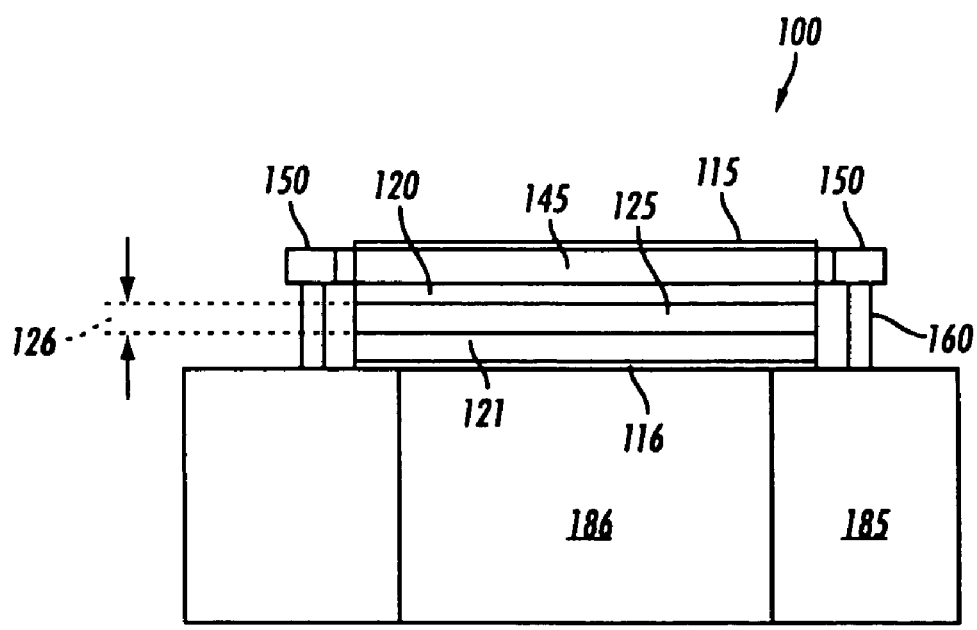
FIG. 4 is a side view of a first exemplary Fabry-Perot cavity structure embodiment.
Figure 5:
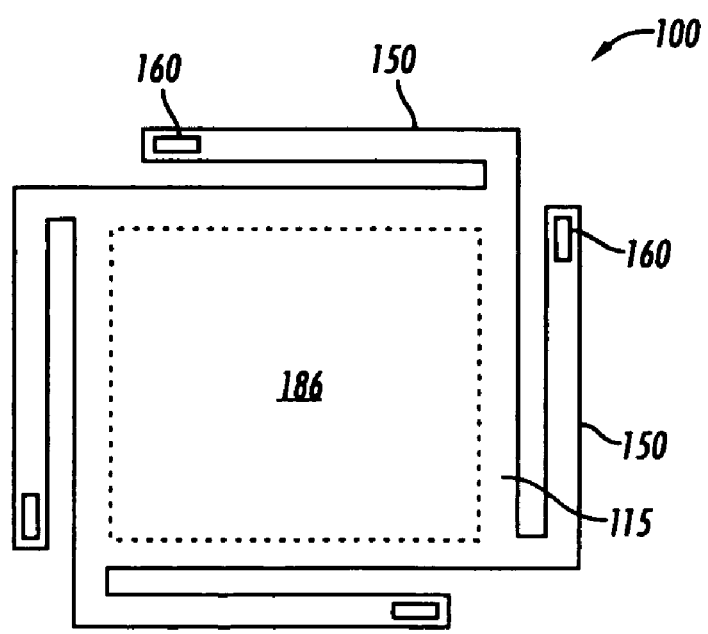
FIG. 5 is a top view of the exemplary Fabry-Perot cavity structure embodiment shown in FIG. 4.

For example, FIG. 4 shows a side view of an embodiment of a micro-electro-mechanically tunable Fabry-Perot array sensor, or spectrophotometer, having a Fabry-Perot micro-electro-mechanically tunable cavity structure 100. FIG. 5 is a top view of the cavity structure 100. As shown in FIG. 4, the cavity structure 100 may include a top mirror 120 and a bottom mirror 121. In various exemplary embodiments, the bottom mirror 121 may be a bottom distributed Bragg reflector (DBR) mirror that includes three pairs of quarter wavelength $Si/SiN_x$ stacks. The top mirror 120 may be a top distributed Bragg reflector (DBR) mirror that includes two pairs of quarter wavelength $Si/SiN_x$ stacks.

As shown in FIG. 4, the cavity structure 100 may also include a top electrode 115 and a bottom electrode 116. The top electrode 115 may be formed on the top mirror 115 via a transparent support element 145. The bottom electrode 116 may be sandwiched between the bottom mirror 121 and a substrate 185.

The substrate 185 may have a transparent substrate portion 186 that may be a hole or a transparent part. The transparent support element 145 may be a transparent substrate. The top electrode 115 and the bottom electrode 116 may be transparent electrodes. Indium tin oxide (ITO) may be used for the transparent bottom electrode 116 and the transparent top electrode 115.

The top and bottom mirrors 120 and 121 may be separated by a gap cavity 125. The gap cavity 125 may be maintained in a variety of ways. In various exemplary embodiments, the gap cavity 125 may be maintained using a plurality of springs 150. As shown in FIGS. 4 and 5, each of the plurality of springs 150 corresponds to a respective one of a plurality of anchors 160. The plurality of springs 150 are connected to the transparent support element 145 such that the top mirror 120 may be separated from the bottom mirror 121 by the gap cavity 125.

The gap cavity 125 may be characterized by the gap distance 126 between the top and bottom mirrors 120 and 121. The gap distance 126 represents a dimension of the gap cavity 125, and may be referred to as a size or height of the gap cavity 125.

The gap distance 126 may be changed or otherwise adjusted. For example, top mirror 120 may be deformed to a dimensional change in the gap cavity 125 by applying a voltage in an exemplary range of 5-100 volts across transparent bottom electrode 116 and transparent top electrode 115, or a charge in an exemplary range of $10^{-11}$ coulombs on transparent bottom electrode 116 and transparent top electrode 115, to effect a change in the gap distance 126 of gap cavity 125 of about 300 to 500 nm. Hence, electrodes 115 and 116 may form a capacitor and the Fabry-Perot cavity structure 100 may have an associated capacitance. As the gap distance 126 of gap cavity 125 decreases, for example, the center frequency of the spectral band passed by the Fabry-Perot cell decreases to shorter wavelengths.

The gap distance 126 may be changed in a way in which the top mirror 115 stays stationary, while the bottom mirror 116 moves relative to the top mirror 115. The gap distance 126 may be changed in a way in which the bottom mirror 116 stays stationary, while the top mirror 115 moves relative to the bottom mirror 116. The gap distance 126 may be changed in a way in which both the top mirror 115 and the bottom mirror 116 are moving relative to each other. In various exemplary embodiments, the top mirror 115 and the bottom mirror 116 maintain a relationship substantially parallel with each other regardless of the relative movement therebetween.

Furthermore, the size of the gap cavity 125 may be changed by a mechanism other than application of a voltage. For example, the size of gap cavity 125 may be changed by a mechanical, thermal or magnetic mechanism.

In the cavity structure 100 shown in FIG. 4, light may be received at the top of the cavity structure 100 through the top electrode 115. The received light may be transmitted through the gap cavity 125 and the transparent substrate portion 186 of the substrate 185 at a tuned wavelength.

Also, a photodetector may be formed on a separate chip (not shown) from the chip upon which the Fabry-Perot cavity structure 100 is formed, so that transmitted light may be detected, if necessary, by a photodetector formed on the separate chip.

Figure 6:
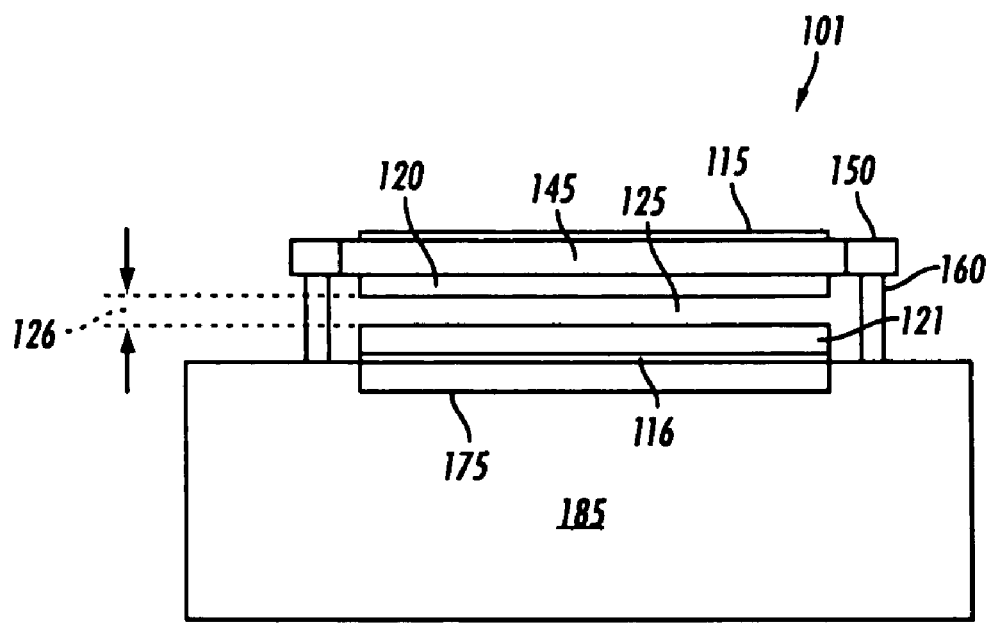
FIG. 6 is a side view of a second exemplary Fabry-Perot cavity structure embodiment.
Figure 7:
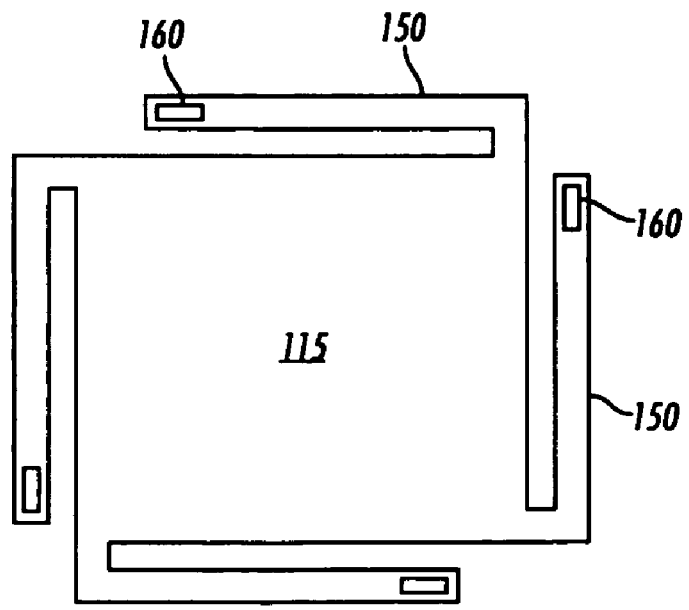
FIG. 7 is a top view of the second exemplary Fabry-Perot cavity structure embodiment shown in FIG. 6.

FIG. 6 shows a side view of another embodiment of a micro-electro-mechanically tunable spectrophotometer having a Fabry-Perot micro-electro-mechanically tunable cavity structure 101. FIG. 7 is a top view of the cavity structure 101. The exemplary embodiment shown in FIG. 6 differs from the embodiment shown in FIG. 4 in that the hole or transparent part 186 may be replaced with a light detector 175 supported by substrate 185. Other, similar feature are numbered similarly to the features disclosed above with respect to FIG. 4, and will not again be introduced. As shown in FIG. 6, a photodetector 175 may be formed on the substrate 185. Thus, light received at electrode 115 and transmitted via gap cavity 125 may be detected by the photodetector 175 supported by substrate 185.

Figure 8:
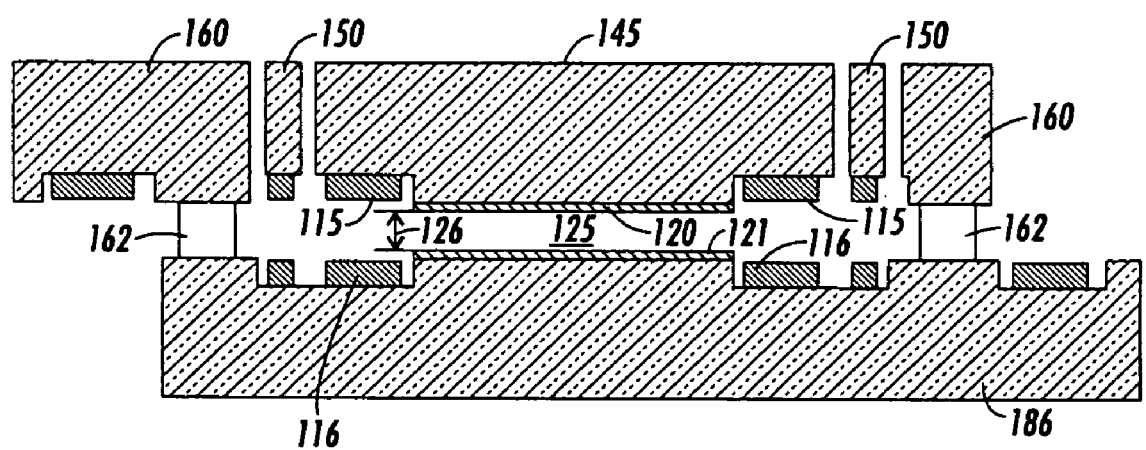
FIG. 8 is a side view of a third exemplary Fabry-Perot cavity structure embodiment.

FIG. 8 shows a side view of another embodiment of a micro-electro-mechanically tunable Fabry-Perot array sensor having a Fabry-Perot micro-electro-mechanically tunable cavity structure 103. The exemplary embodiment shown in FIG. 8 differs from the embodiment shown in FIG. 4 in that the transparent part 186 spans the entire base of the structure. Further, electrodes 115 and 116, used to set the size of gap cavity 125, have been repositioned opposite one another across gap cavity 125. Further, a default spacing between transparent support element 145 and transparent substrate portion 186 is determined by a height of spacer 162 positioned between anchors 160 and transparent substrate portion 186. The height of spacers 162 may be varied across Fabry-Perot cells in an array to change the dynamic range of the respective Fabry-Perot cells in the array, as described with respect to FIGS. 12 and 13, below. Other, similar feature are numbered similarly to the features disclosed above with respect to FIG. 4, and will not again be introduced.

To reduce the cost of manufacturing the Fabry-Perot array sensor embodiment shown in FIG. 8, a wet etching process may be used to separate form springs 150 that support top support 145. In one exemplary embodiment, hydrofluoric acid (HF) may be used to etch through the silica wafer through holes in a protective etch mask of polysilicon. However, other wet etching solutions and techniques may be used.

Figure 9A:
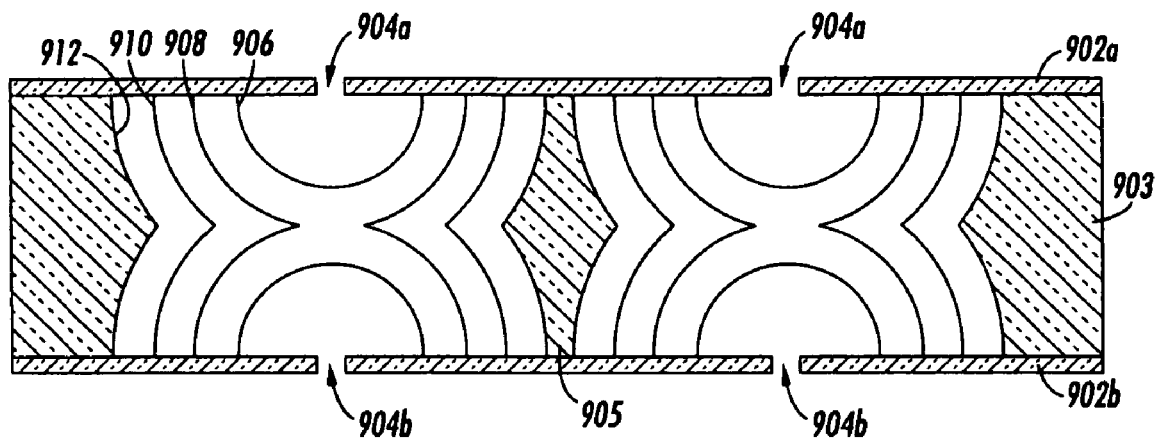
FIG. 9A schematically illustrates a through-wafer wet etching technique used to create components shown in FIG. 8.
Figure 9B:
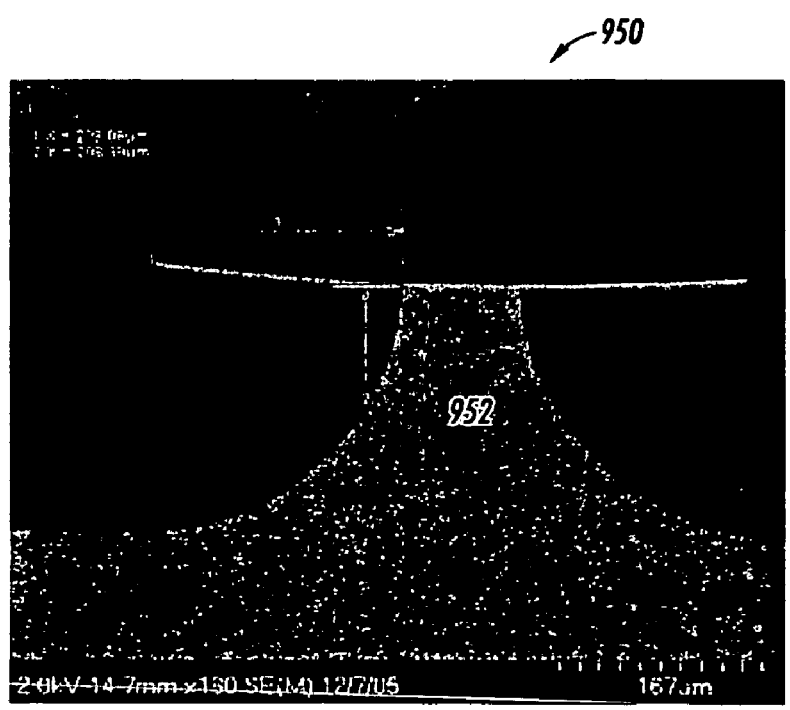
FIG. 9B is a scanning electron microscope photograph of an etch performed using the through-wafer wet etching technique of FIG. 9A.

FIG. 9A schematically illustrates a through-wafer wet etching technique that may be used to separate springs 150 from movable, transparent support element 145 shown in FIG. 8. As shown in FIG. 9A, polysilicon masking material, 902a and 902b, may be placed on either side of a silica substrate 903 to be etched. Holes, 904a and 904b, in polysilicon masking material, 902a and 902b are aligned on opposite sides of silica substrate 903. Masked silica substrate 903 may then be immersed in a hydrofluoric acid (HF) solution. Lines 906, 908, 910 and 912, shown in FIG. 9A represent how etched fronts grow over time from holes 904a and 904b from both sides of masked silica substrate 903 until the etched fronts meet, resulting in a wet-etch-created silica beam 905. By aligning multiple holes on either side of silica substrate 903 in a configuration, for example, as shown by the outline of Fabry-Perot micro-electro-mechanically tunable cavity structure 100 in FIG. 5, moving silica plate 145 and springs 150 may be formed. For example, the disclosed wet etching process may be performed upon a typical wafer lot of 24 wafers, simultaneously and inexpensively, in only a few hours. FIG. 9B is a scanning electron microscope photograph 950 of an etched groove 952 performed using the through-wafer wet etching technique of FIG. 9A.

Figure 10:
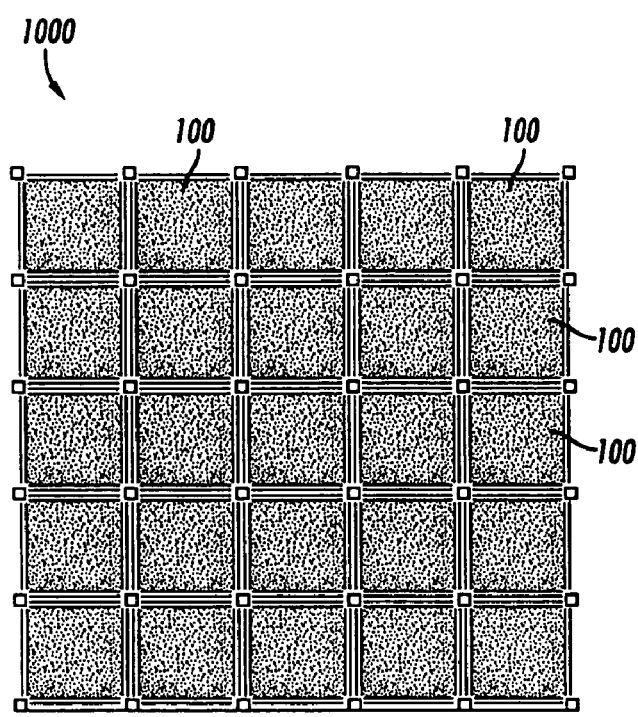
FIG. 10 schematically illustrates an exemplary Fabry-Perot array in which exemplary Fabry-Perot cavity structures are placed side by side to form an N×M array.

FIG. 10 illustrates an exemplary addressable Fabry-Perot array 1000. As shown in FIG. 10, the Fabry-Perot array 1000 may include a plurality of adjacently located Fabry-Perot cavities 100. For example, FIG. 10 shows a 5×5 array of cavities. However, in general, other arrays may also be used, such as an N×M array, where N and M are integers. Alternatively, the cavities may also be arranged in other geometrically shapes, such as a triangle, a diamond, a hexagon, a trapezoid, or a parallelogram. Each arrayed and/or shaped set of cavities form a block of cavities. A plurality of blocks may be used to form a larger Fabry-Perot array.

Figure 11:
FIG. 11 schematically illustrates an exemplary Fabry-Perot array in which exemplary Fabry-Perot cavity structures are overlapped to form a full-width array.

In various exemplary embodiments, the cavities each may include a silicon membrane attached directly to a silicon spring, so that the silicon membrane may move to change the size of the cavity. In various exemplary embodiments, the cavity may include membranes as parallel plates attached to a silicon frame. The cavities may be located close to each other without much wasted space in between, so that the amount of "dead space" between adjacent membranes may be reduced or minimized, and the space used for sensing may be increased or maximized. Alternatively, as shown in FIG. 11, a cross-section of two N×M fixed-gap cavity groups, shown in FIG. 11 as 1102 and 1104, respectively, demonstrates that two N×M fixed-gap cavity groups may be overlapped to achieve a larger total array size. Such overlapping may be used repeatedly to overlap multiple N×M fixed-gap cavity groups, in succession, to create a Fabry-Perot array that is big enough to address a whole page, i.e., a full-width array.

Figure 12:
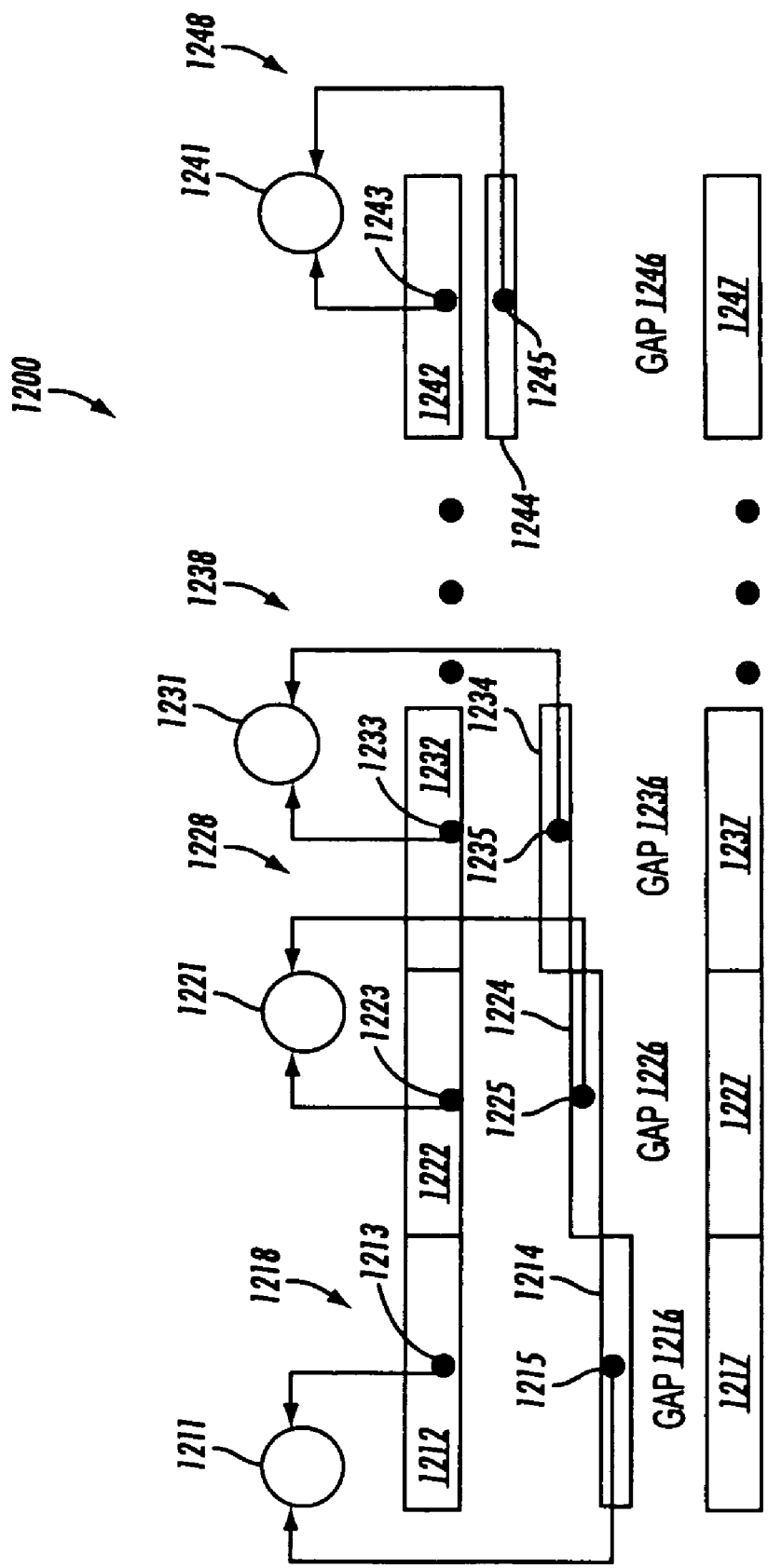
FIG. 12 schematically illustrates a first exemplary gap configuration in an exemplary Fabry-Perot array embodiment.

FIG. 12 depicts a cross-section of a fixed-gap cavity group arranged in an N×M array 1200. As shown in FIG. 12, this array includes a number of N rows and a number of M columns of individual Fabry-Perot cavities. In FIG. 12, only one column is illustrated with N number of cavities. As shown in FIG. 12, the array 1200 includes cavities 1218, 1228, 1238 and 1248. Each of the cavities may include a substrate portion, a top mirror, and a bottom mirror. For example, in cavity 1218, a voltage 1211 may be applied between a contact point 1213 of a substrate portion 1212 and a contact point 1215 of a top mirror 1214, so that the distance 1216 between the top mirror 1214 and a bottom mirror 1217 may be adjusted by adjusting the voltage 1211. The gap distances 1216, 1226, 1236 and 1246 for gap cavities 1218, 1228, 1238 and 1248, respectively, are different from each other, so the group may cover a spectrum range. The gap distances are fixed during an operation. The gap distances may be reconfigured before, after or between operations.

The reconfiguration may be accomplished electrically, mechanically, thermally or magnetically. The reconfiguration may also be achieved by recalibration to accommodate a new set of conditions. For example, this reconfiguration may change the spectral coverage of a fixed gap group from one spectral range to another spectral range.

As discussed above, a portion of a toned patch or test image may correspond to a gap cavity group. Thus, different spectral information may be obtained simultaneously from a portion of a toned patch or test image, with each gap cavity in the group of gap cavities obtaining a unique spectral signal corresponding to the fixed size of the respective gap cavity. Accordingly, motion of the Fabry-Perot membranes is not needed, thereby improving the reliability and lifetime of the gap cavities.

Compared to a system in which each gap cavity corresponds to a portion of a toned patch or test image, the arrangement shown in FIG. 12 may be used to reduce the spectral resolution of a Fabry-Perot array by a factor of the size (number of gap cavities) of the gap cavity group. For example, when an N×M group is configured to pass a common wavelength, the spectral resolution may be reduced by a factor of N×M. On the other hand, because a number of N×M measurements may be simultaneously obtained, the speed of measurement may be increased by a factor of N×M.

The size of each gap cavity group may be the same, so that spectral information at each wavelength may be obtained by the same number of gap cavities whose gap cavity sizes correspond to the wavelength. However, the size of each gap cavity group may also be different, depending on different needs of applications.

The reconfigurability may be part of the calibration for each Fabry-Perot gap cavity. For example, there may be a thickness variation among gap cavities during the microfabrication process. Typical variation may be less than two percent. Nevertheless, two percent variation in the size of the gaps could cause significant optical quality degradation. However, in a system shown in FIG. 12, each Fabry-Perot gap cavity may be fine-tuned to the same gap size for a desired wavelength range with a set of offset initial voltages. The offset initial voltages may be stored in a memory area within the system and may be used to adjust the Fabry-Perot cell gaps across a Fabry-Perot array, and may be updated at any time. Another approach may be to calibrate the sensor with a known sample, and then, instead of fine-tuning the cells to the same gap size with a set of offset initial voltages, storing a table of the errors. Assuming that the errors don't change, the stored table may be used to correct readings that the sensor makes later.

Figure 13:
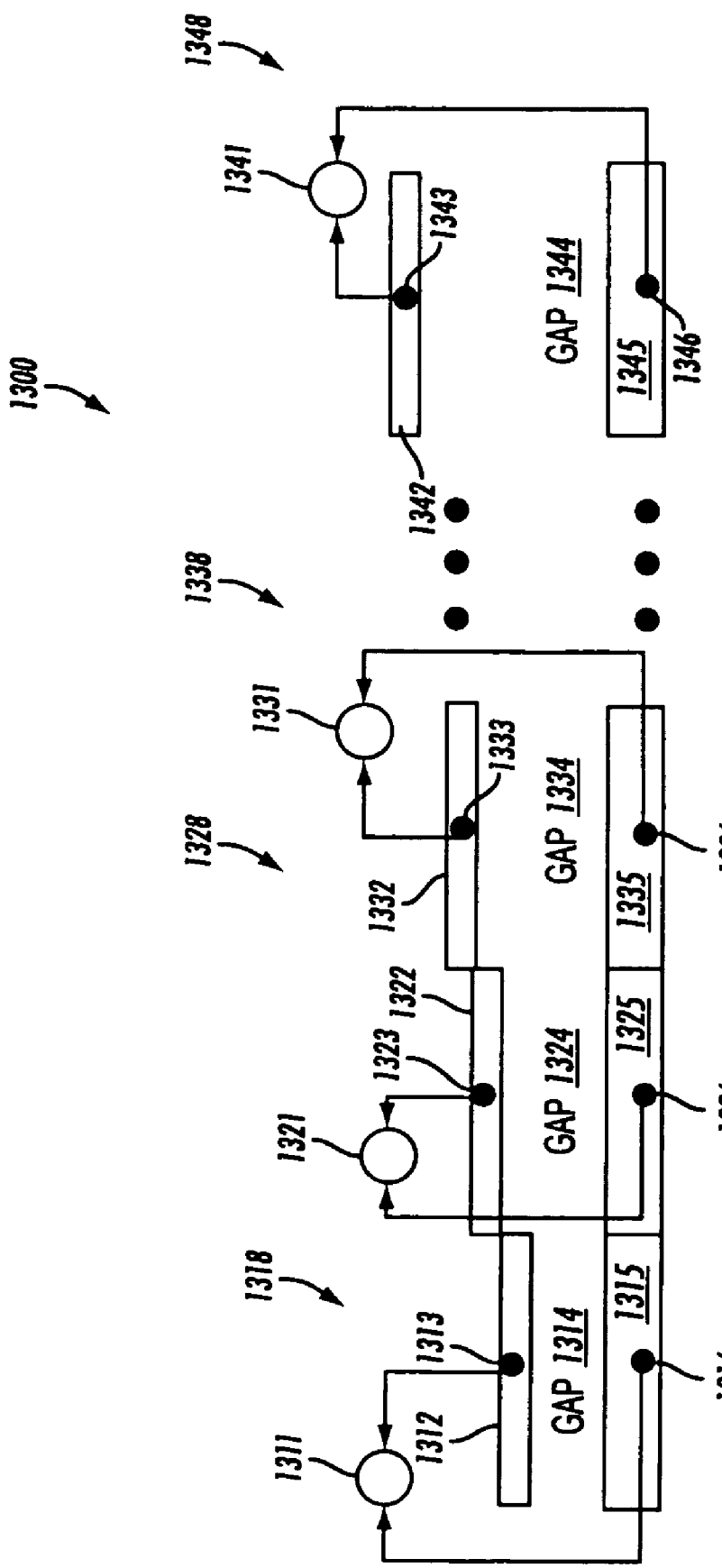
FIG. 13 schematically illustrates a second exemplary gap configuration in an exemplary Fabry-Perot array embodiment.

FIG. 13 illustrates a second exemplary configuration 1300 of gap cavities 1318, 1328, 1338 and 1348. As shown in FIG. 13, within gap cavity 1318, a voltage 1311 may be applied between a contact point 1313 of a top mirror 1312 and a contact point 1316 of a bottom mirror 1315, such that the distance 1314 between the top mirror 1312 and the bottom mirror 1315 may be adjusted. For example, as shown in FIG. 13, the top mirror 1312 may be the part whose position is adjustable, while the bottom mirror 1316 may be stationary.

The arrangements shown in FIGS. 12 and 13 may be used to detect spectral information from a portion of a toned patch or test image in various parts of the electromagnetic spectral range. Depending on the mechanical tuning range of the mirrors used to create the gap cavity and the number of such gap cavities, the spectral range resulting from the gap cavity system may range from ultraviolet to near, mid or high infrared wavelengths. Additionally, the wavelength resolutions may be fine-tuned to a narrow range, such as sub-nanometer range, based on fixed sizes of gap cavities. For example, the arrangements in FIGS. 12 and 13 may also be reconfigured to be used as a conventional RGB filter, if desired, in which RGB spectral information may be collected for portions of a toned patch or test image.

The sizes of the cavity gaps in an N×M two-dimensional matrix may be arranged in an increasing, decreasing or other pre-determined fashion. Although each Fabry-Perot gap cavity may have a dynamically configurable fixed size, the size of the gap is not changed during marking engine operations. The fixed size of a gap cavity may be reconfigured, for example, before a marking engine operation, after a marking engine operation or between marking engine operations.

In a Fabry-Perot array, such as the Fabry-Perot arrays depicted in FIGS. 11-13, a plurality of gap cavity groups may be provided within a single N×M. Each gap cavity group may have a set of fixed gaps and may be used to obtain spectral information from a portion of a toned patch or test image for a specific spectral band.

Each fixed gap only allows a narrow band of wavelength to transmit (or reflect) light. Within a gap cavity group, the sizes of fixed gaps may differ from one another so that the spectra of a portion of a toned patch or test image may be assembled from each wavelength band of each of the fixed gaps within the gap cavity group. In particular, each portion of a toned patch or test image may contain a group of spectral characteristics, each spectral characteristic being associated with a group of respective wavelengths. Thus, because a portion of a toned patch or test image corresponds to a group of gap cavities, each specific gap cavity in a gap cavity group may be designated to obtain a spectral characteristic associated with a specific wavelength that corresponds to the gap cavity size of the specific gap cavity.

Also, because the Fabry-Perot array contains a plurality of gap cavity groups and each gap cavity group may have one gap cavity having the specific gap cavity size, all the gap cavities having the specific gap cavity size form a sub-array of gap cavities. This sub-array may obtain a spectral image at the specific wavelength corresponding to the specific gap cavity size.

As discussed above with respect to FIG. 10, a gap cavity group may be arranged in a N×M array, where N and M are integers, so that the group occupies a square or rectangle. Alternatively, the group of gap cavities may also be arranged in other geometrically shapes, such as a triangle, a diamond, a hexagon, a trapezoid, or a parallelogram.

When the gap cavity group is arranged in a N×M array, where N and M are integers, N×M equals the number of wavelength bands available for detection by the array. For example, to obtain 12 points in the wavelength spectra between 400 mm and 700 mm, the gap cavity group may have a 4×3, 6×2 or 12×1 single Fabry-Perot design. The gaps may be configured and reconfigured to obtain spectral information of the portion of a toned patch or test image at a different range and/or resolution of optical spectrum. For example, one range of optical spectrum may be from 400 nm to 700 nm. Another range may be from 380 nm-730 nm. Yet another range may be 400-550 nm and 550-700 nm etc.

Figure 14:
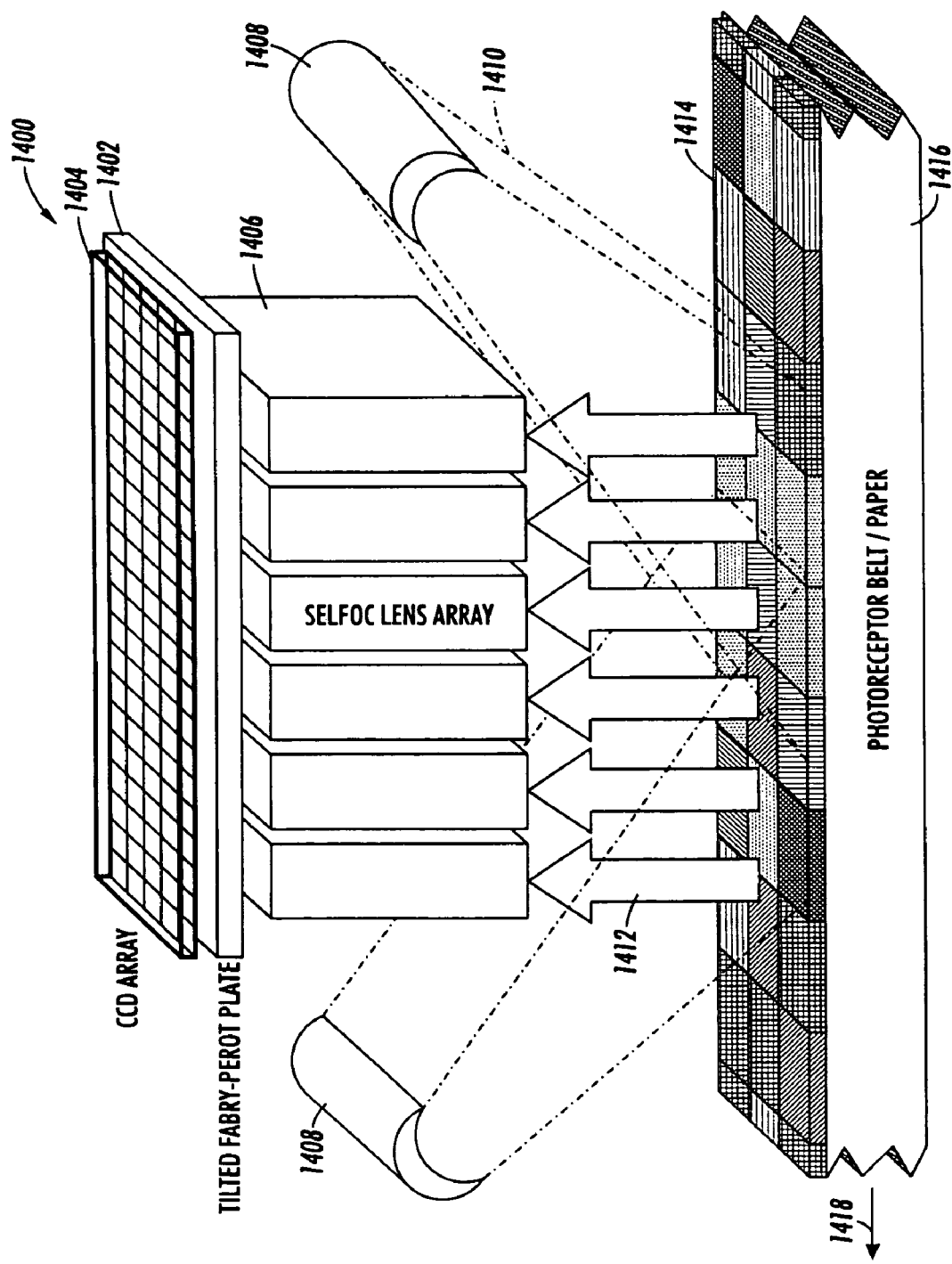
FIG. 14 schematically illustrates an exemplary marking engine with an exemplary inline Fabry-Perot array spectral information measuring system.

FIG. 14 illustrates an exemplary Fabry-Perot optical system 1400 for use within an exemplary marking system. As shown in FIG. 14, the Fabry-Perot optical system 1400 provides a Fabry-Perot tunable filter array 1402. Each element of the filter array 1402 may be a gap cavity structure, for example, as shown in FIGS. 4, 6 and 8. Further, each Fabry-Perot cavity structure may be configured individually, or as a gap cavity group, as disclosed above with respect to FIGS. 12 and 13.

The filter array 1402 may be located between an optical lens 1406 and a light sensing array 1404, such as a CCD or CMOS photodetector array. The lens may be selected from a variety of lenses, such as Selfoc® lens array with a fixed focal length selected according to need. The size of the gap cavity in each of the gap cavity structure may be adjusted by, for example, a switching circuit (not shown), to give a desired transmissive frequency. The switching circuit may be a controller that sets Fabry-Perot gap distances to achieve a desired filtering frequency within individual Fabry-Perot cells, or to achieve a desired set of frequencies across a Fabry-Perot gap cavity group or a Fabry-Perot array. The provision of a desired frequency or group of frequencies may be from, for example, a user interface that receives input from a user. The switching circuit may also be a sampling circuit that provides modulation data that contains modulation signals to select the desired gap cavity or gaps. One gap cavity structure, or a group of gap cavity structures, may correspond to a portion of a toned patch or test image. As a result, the incoming image may be filtered to produce a filtered spectral image produced by filtering the incoming image at a wavelength corresponding to the size of the respective Fabry-Perot gap cavities. The filtered image may be output through Fabry-Perot array 1402 to the light sensing array 1404.

As discussed above, the gap distance of the gap cavity may be adjustable. Thus, the light passing through the Fabry-Perot cells in the Fabry-Perot array may be filtered at any wavelength covered by the spectral space within the adjustable range of the gap cavity. Thus, the filtered image will be generated in various wavelengths by adjusting the size of the gap cavities to transmit selectively very narrow wavelengths or collectively a group of wavelengths of a portion of a toned patch or test image.

The filter array may be a two-dimensional array of Fabry-Perot cells that are addressable as a group, or the Fabry-Perot cells may be addressable independently. If the Fabry-Perot cells are addressable as a group, all membranes in the group may be actuated by a single control signal, such as a voltage. If the Fabry-Perot cells are individually addressable, each Fabry-Perot cell may be actuated by a control signal, such as a voltage, specifically designated for each individual cell. Further, actuation of individual Fabry-Perot cells, or groups of Fabry-Perot cells, in a Fabry-Perot array may be performed after an appropriate offset voltage has been applied to compensate the cell(s) for variations in the manufacture.

Spectral resolution of the filter array 1402 may depend on the mean reflectivity of the mirrors forming the gap cavity. The spectral range of a gap cavity may depend on the initial size of the gap cavity and the quarter wavelength Si/SiNx stacks that may be used. For light in the infrared region, the size of gap cavity may be on the order of the infrared wavelength range. When the tuning range of the gap cavity is limited because of, for example, structural limitations, a system consisting of more than one membrane with different initial sizes of gap cavities and different quarter wavelength stacks may be used to cover a broader spectral range. The initial gap distance of Fabry-Perot cells may be determined during the manufacturing process by changing the height of spacer 162, as shown in FIG. 8, in individual Fabry-Perot cells or groups of Fabry-Perot cells used in a Fabry-Perot array, for example. Such a system may be designed to cover a spectral range from ultra-violet (UV) to infrared (IR). A detailed description of such a system is provided in copending application Ser. No. 11/092,835 filed Mar. 30, 2005, by Wang et al., the entire disclosure of which is herein incorporated by reference.

In FIG. 14, the filter array 1402 may be made of an array of small-sized micro Fabry-Perot cells. Such a structure may ensure the simultaneous actuation of the Fabry-Perot cells. Such a structure may also improve the uniformity among the Fabry-Perot cells, because each gap cavity may be individually adjusted based on calibration data containing calibration signals. The calibration may be conducted by, for example, the switching circuit which may be connected to the filter array 1402, as disclosed with respect to FIGS. 12 and 13.

As shown in FIG. 14, Fabry-Perot optical system 1400 may be configured within an exemplary marking engine so that the Fabry-Perot optical system 1400 is positioned above the path of a photoreceptor belt 13 or a non-photosensitive output substrate, such as an intermediate belt or paper, as the output substrate passes through the marking engine. Light emitted by one or more illumination sources 1408 may be reflected from a toned patch or test image on the photoreceptor belt 13 or output substrate and reflected through optical lens 1406, into filter array 1402 where the light may be filtered, as disclosed above, prior to being measured by light sensing array 1404.

Embodiments configured to measure spectral information from a photoreceptor, as well as, embodiments configured to measure spectral information from an output substrate, may illuminate the respective surfaces using LCLED technology. The LEDs selected may be based upon the photosensitive characteristics of the surface with which the Fabry-Perot array sensor will be used.

For example, one embodiment used to measure spectral information from non-photosensitive output substrate may use 8 LED illuminators, centered at ~437 nm, ~468 nm, ~507 nm, ~523 nm, ~573 nm, ~596 nm, ~626 nm, respectively. However, in the case of Fabry-Perot array sensor embodiments used to measure spectral information from toned patches and/or images on a photoreceptor belt 13, with a photoactive response discussed above with respect to FIG. 3, LEDS may be selected that illuminate at wavelengths centered at wavelengths for which photo generation of the photoreceptor belt 13 has minimum electron-hole pair generation. One exemplary embodiment of the disclosed Fabry-Perot array sensor illuminates the toned patches and/or images on a photoreceptor belt 13 with multiple LEDs at specific wavelengths: (1) a blue LED centered around 470 nm (near the low sensitive region of the photoreceptor belt 13); and (2) two or more LEDs in the infrared (over 900 nm) wavelength bands.

Figure 15:
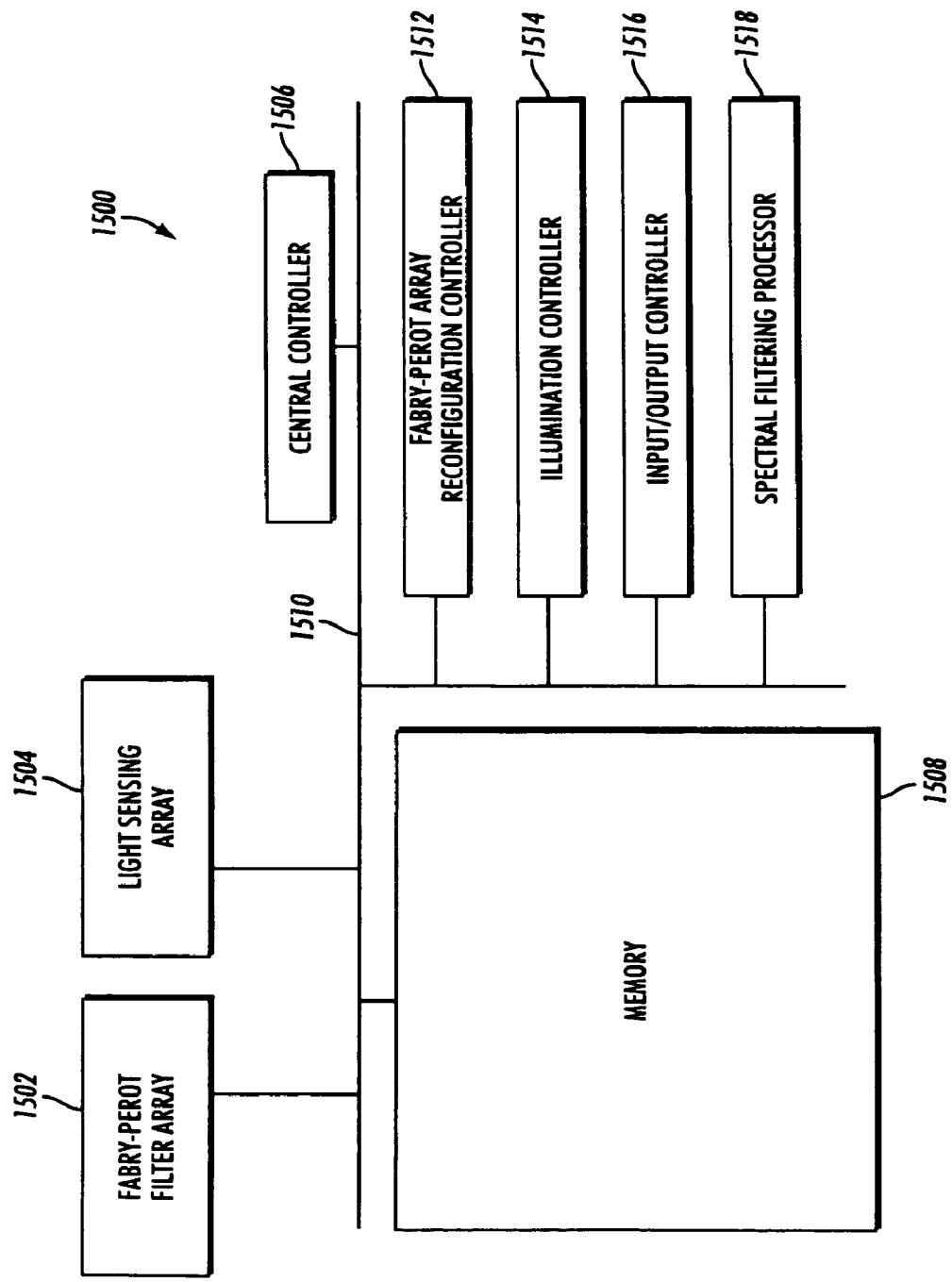
FIG. 15 is a block diagram illustrating the exemplary marking engine inline Fabry-Perot array reflectance measuring system shown in FIG. 14.

FIG. 15 is a block diagram of an exemplary Fabry-Perot optical system 1500, similar to the Fabry-Perot optical system disclosed above with respect to FIG. 14. The spectral system 1500, as shown in FIG. 15, may include a Fabry-Perot filter array 1502, a light sensing array 1504, a central controller 1506, a memory 1508, a Fabry-Perot array reconfiguration controller 1512, an illumination controller 1514, a spectral filtering processor 1518, and an input/output controller 1516, each connected by a connection or bus 1510. The Fabry-Perot array 1502 may be a Fabry-Perot array, for example, as disclosed above with respect to FIGS. 10-14.

The various elements shown in FIG. 15 may perform their respective functions under control of central controller 1506.

For example, the Fabry-Perot reconfiguration controller 1512 may reconfigure the sizes of the gap cavities in the Fabry-Perot array 1502, before, after or between marking operations, as disclosed above with respect to FIGS. 12 and 13 based upon parameters stored in memory 1508 or received from controller 1506. Illumination controller 1514 may control LEDs or other sources of illumination to illuminate a toned patch and/or images that has been placed by a marking engine upon a photoreceptor belt 13 or output substrate. Light may be reflected from the toned patch and/or image, passes through Fabry-Perot array 1502 and may be received by light sensing array 1504. The spectral filtering processor 1518 may receive and process output generated by the light sensing array 1504 to generate spectral information and/or measured spectral information that may be output through input/output controller 1516, for example, to an external processor supporting a color stabilization process, such as generating or updating TRCs, and/or may be stored in memory 1508 for future use.

Activities performed by the Fabry-Perot array reconfiguration controller 1512, the illumination controller 1514, the input/output controller 1516, and the spectral filtering processor 1518, may be performed under the coordinated control of central controller 1506. However, each controller/processor may also perform tasks autonomously or semi-autonomously. For example, illumination controller 1514 may illuminate individual LEDs of specific illumination bandwidths and/or in a certain order based on instructions stored in memory 1508 and/or received from central controller 1506. Further, upon receiving an instruction from central controller 1506, Fabry-Perot array reconfiguration controller 1512 may coordinate arrangement of the Fabry-Perot cell gaps within Fabry-Perot array 1502 in accordance with a predetermined configuration stored in memory 1508 and/or received from central controller 1506, and may be able to autonomously monitor and maintain, via small corrections, the precise gap distances assigned to specific Fabry-Perot cells. Further, spectral filtering processor 1518 may be programmed to autonomously receive raw output from light sensing array 1504 and may process the received values based upon knowledge of Fabry-Perot cell gap cavity group configurations received from Fabry-Perot array reconfiguration controller 1512. In this manner, different Fabry-Perot array configurations set by Fabry-Perot array reconfiguration controller 1512 may be automatically and correctly interpreted and the derived information made available via input/output controller 1516 to other processes.

Figure 16:
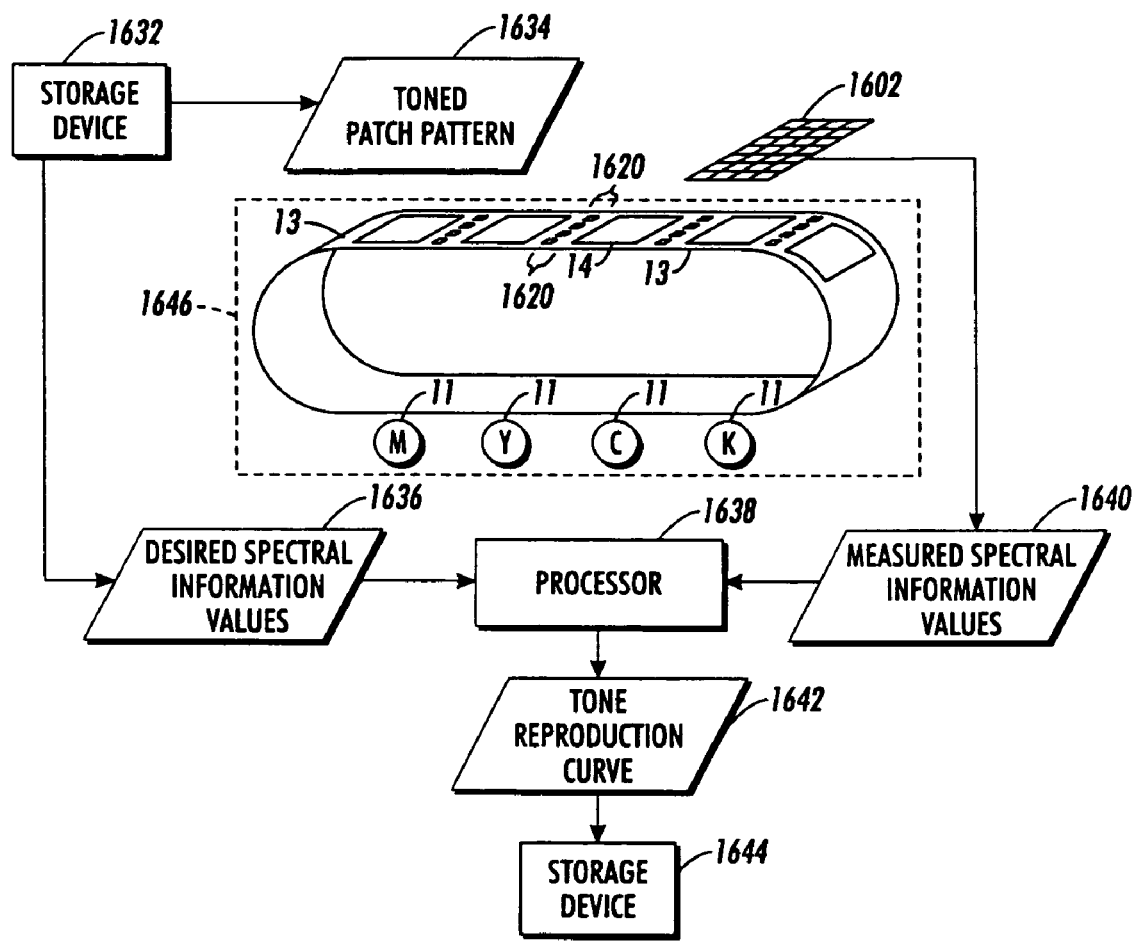
FIG. 16 schematically illustrates a marking engine undergoing calibration according to a process that uses the first exemplary embodiment of a Fabray-Perot array sensor.

FIG. 16 schematically illustrates a marking engine undergoing calibration by producing a tone reproduction curve based upon feedback received from an exemplary Fabry-Perot array sensor, as disclosed above. This exemplary method is based on the method disclosed in U.S. patent application Ser. No. 11/097,727, incorporated by reference above.

As shown in FIG. 16, a storage device 1632 stores a toned patch pattern 1634 in the form of data. The toned patch pattern 1634 may include a number of toned patches and every toned patch has a desired a set of desired spectral information values 1636. As such, the storage device 1632 may store a set of desired spectral information values 1636 for each toned patch pattern 1634. A toned patch pattern 1634 may specify any color, including black and shades of gray. The marking engine 1646 accepts the toned patch pattern 1634 and produces a toned patch 1620. The toned patch 1620 may include one or more toned patches. Every toned patch 1620 is associated with a toned patch pattern 1634 because each toned patch 1620 results from the printing of a toned patch pattern 1634.

For example, as shown in FIG. 16, marking engine 1646 may include a photoreceptor belt 13 upon which both pitches 14 and exemplary toned patches 1620 have been applied. Marking engine 1646 may retrieve toned patch patterns 1634 from a storage device 1632 and use the toned patch pattern data to generate and place toned patches 1620 upon photoreceptor belt 13, for example, in between pitches 14 upon the photoreceptor belt 13. Ink may be applied to the respective toned patches by primary color applying units 11. One or more Fabry-Perot array sensors 1602 may be positioned above photoreceptor belt 13 so that light emitted by illumination sources (not shown), and reflected from a toned patch or test image, passes through Fabry-Perot array sensors 1602.

For example, in response to an enable command received from processor 1638, the one or more Fabry-Perot array sensors 1602 may initiate a sequence that results in each of the one or more Fabry-Perot array sensors 1602 producing measured spectral information values 1640 that may be passed to processor 1638. Processor 1638 may compare the measured spectral information 1640 with desired spectral information values 1636 retrieved from storage device 1632. Processor 1638 may then generate and/or update TRC 1642 based on a difference between the measured spectral information and the desired spectral information value 1636 and store the new/updated generated TRC 1642 in storage device 1644 so that the TRC 1642 may be used by marking engine 1646 to control the output of future pitches 14 and toned patches 1620 upon the photoreceptor belt 13. TRCs may be common for the whole page or may be common for a group of pixels or may be common or different for different pixels.

The one or more Fabry-Perot array sensors 1602 may be configured to detect toned patches and/or images on a photoreceptor belt 13. As discussed above, such an embodiment may be configured with illumination sources, for example, LEDs that emit wavelengths of light that are outside the photosensitive response range of the photoreceptor belt 13 with which the one or more Fabry-Perot array sensors 1602 are used. By carefully selecting the illumination sources, as discussed above with respect to FIG. 3, the one or more Fabry-Perot array sensors 1602 may be configured for use with any photosensitive surface, for example, photoreceptor belt 13, without ghosting.

Figure 17:
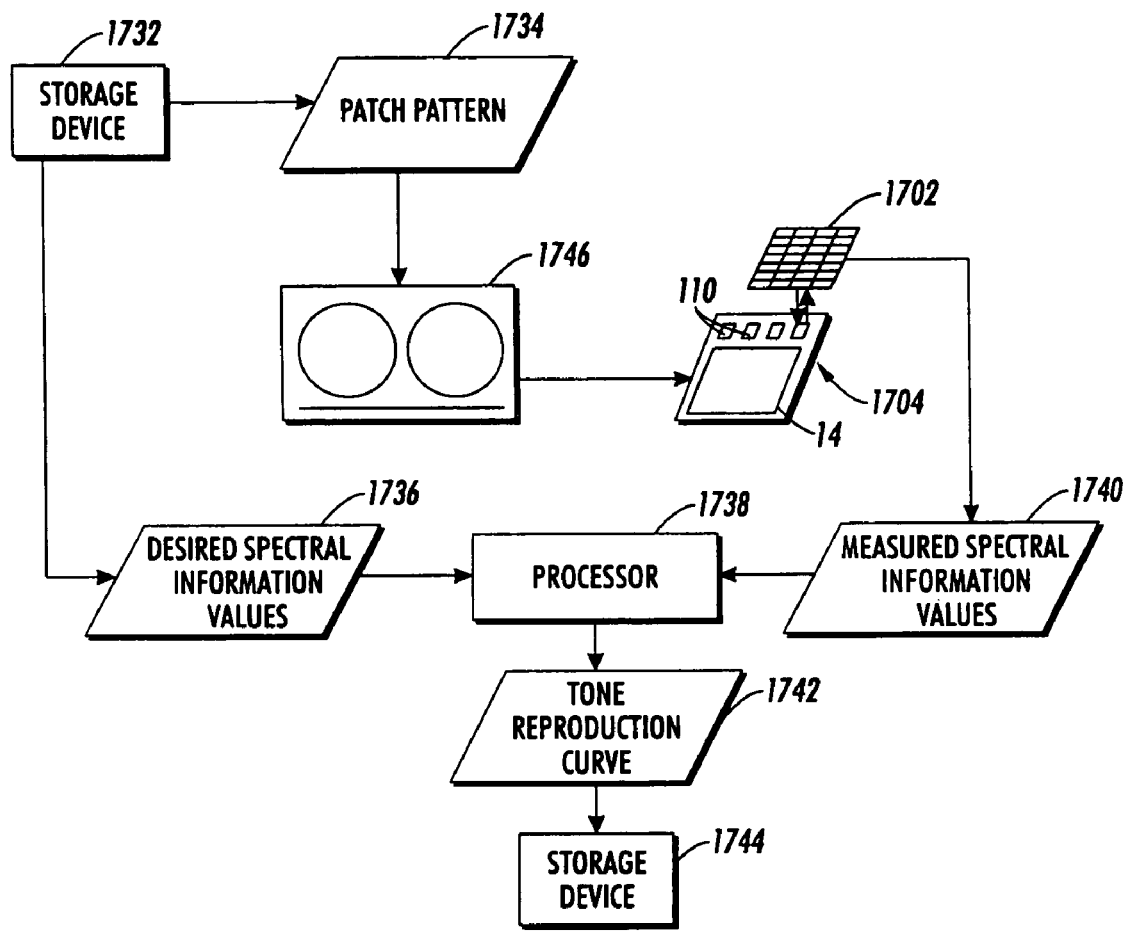
FIG. 17 schematically illustrates a marking engine undergoing calibration according to a process that uses the second exemplary embodiment of a Fabray-Perot array sensor.

FIG. 17 schematically illustrates a marking engine undergoing calibration by producing a tone reproduction curve based upon feedback received from an exemplary Fabry-Perot array sensor, similar to the process disclosed above with respect to FIG. 16. However, as shown in FIG. 17, the exemplary Fabry-Perot array sensor 1702 may be positioned to measure spectral information from toned patches and/or test images after the toned patches/test images have been transferred to a non-photosensitive output substrate 1704, for example paper or an intermediate belt. Objects in FIG. 17, corresponding to similar objects disclosed above with respect to FIG. 16, are identical, and will not be reintroduced. However, as shown in FIG. 17, the Fabry-Perot array sensor 1702 is not positioned over the photoreceptor belt 13 of marking engine 1746. Instead, Fabry-Perot array sensor 1702 may be positioned along the inline process to measure spectral information from toned patches and/or test images disposed on an output substrate as it emerges from marking engine 1746.

As discussed above, because the output substrate upon which the toned patches and/or test images are disposed is not photosensitive, the illumination sources used by Fabry-Perot array sensor 1702 need not be preferably limited to emitting light at wavelengths outside the photosensitive range of a photoreceptor. Therefore, the Fabry-Perot array sensor 1702 may include illumination sources that emit any wavelength of light. In one exemplary embodiment, the Fabry-Perot array sensor 1702 may be configured so that it may illuminate subject matter with eight or more separate illumination band across the visible spectrum, for example, 437, 468, 507, 523, 573, 596, 626, and 662 nm. However, selected illumination bands should not be considered to be limited to such wavelengths. Any illumination wavelength may be used, including white light, that is, light include a broad range and/or all wavelengths.

Although only a single Fabry-Perot array sensor 1702 is shown in FIG. 17, a marking system could be configured with multiple Fabry-Perot array sensors. Each of the Fabry-Perot array sensors 1702 provides spectral information and/or reflectance measurement values in support of inline color stabilization processes. For example, depending upon the size and configuration of the respective Fabry-Perot arrays, multiple Fabry-Perot array sensors 1702 could be positioned at multiple locations along the internal photoreceptor belts of the marking engine and/or along the output path of the generated non-photosensitive output. Individual Fabry-Perot array sensors 1702 located at different locations within the marking engine may illuminate and may collect spectral information simultaneously, so long as each Fabry-Perot array sensor 1702 is shielded from all other light sources that may corrupt collected spectral information and/or measured spectral information.

Figure 18:
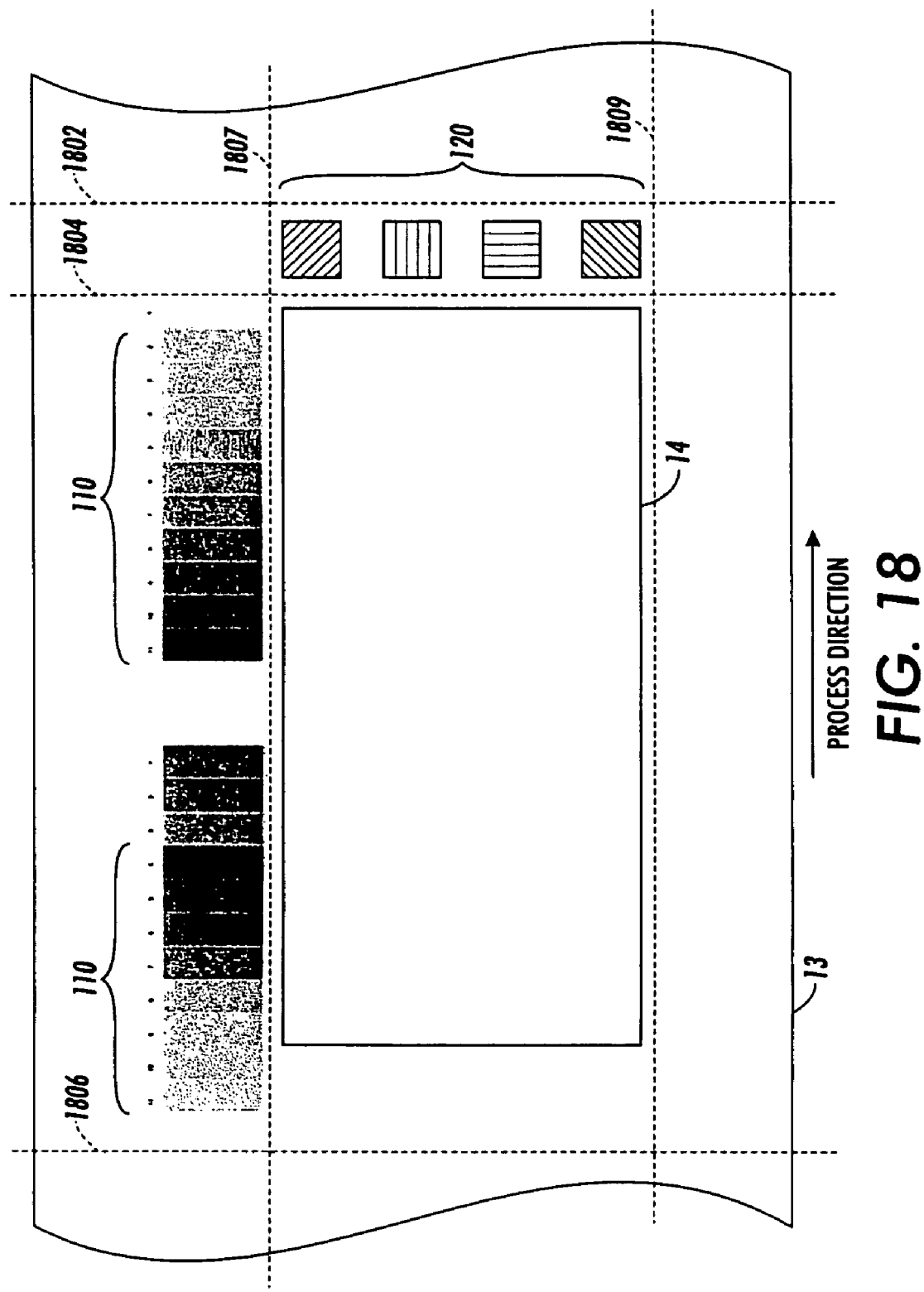
FIG. 18 is a schematic representation of an exemplary pitch and an exemplary set of toned patches.

FIG. 18 presents a detailed view of toned patches 110 and toned patches 120 placed upon a photoreceptor belt 13 relative to an image pitch 14. As shown in FIG. 18, dashed lines 1802 and 1806 represent exemplary leading and trailing boundaries, respectively, of an exemplary output substrate to which the toned patches 120 and image pitch 14 may be transferred, for example, in a marking system in which spectral information may be collected from toned patches and images on the output substrate. The toned patches 120 may also be applied as a single patch stripe developed along the belt or photoreceptor to cover the entire region between boundaries 1804 and 1802. Dashed lines 1804, 1806, 1807 and 1809 represent exemplary leading, trailing, left and right boundaries, respectively, of an exemplary output substrate to which the image pitch 14, only, may be transferred, for example, in a marking system in which spectral information may be collected only from toned patches and/or images directly from a photoreceptor belt 13, or intermediate transfer belt, and toned patches 110 and 120 are not output to an output substrate.

The toned patches and image represented in FIG. 18 may be used to present colors throughout the color gamut or could be of single color. Spectral information collected from these toned patches may be processed as disclosed above with respect to FIG. 16 or FIG. 17 to support color stabilization processes. Details related to the nature and use of toned patches 110 and 120 are disclosed in copending U.S. patent application Ser. No. 11/428,489, entitled "Pitch-to-Pitch Online Array Balance Calibration." Further, a test image based upon a stored image pattern may be periodically placed in one or more image pitches 14 and, may be processed in the same manner as a toned patch to support color stabilization processes.

Figure 19:
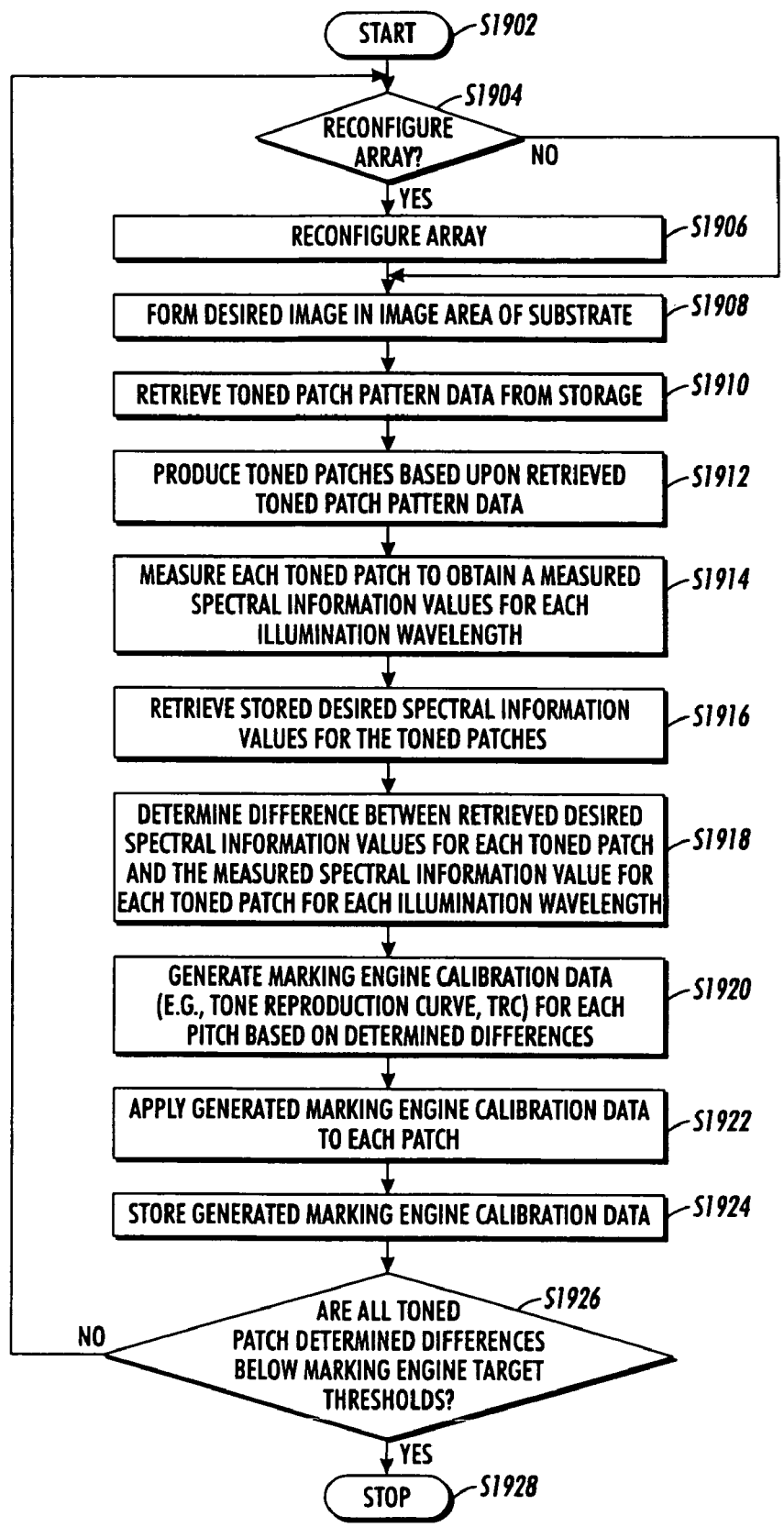
FIG. 19 is a flow diagram representing exemplary methods of calibrating exemplary marking systems according to the disclosure.

FIG. 19 is a flow diagram representing an exemplary method for color calibrating exemplary marking systems according to this disclosure. The disclosed color calibration process may be initiated manually by a user, for example, in response to an observed marking system condition, or automatically, for example, as periodically scheduled maintenance or in response to a condition detected by a marking system controller or otherwise. For example, the process may be controlled and executed by a color calibration processor such as that described above with respect to FIGS. 16 and 17 which may control a Fabry-Perot array sensor based upon communication with Fabry-Perot array sensor control modules such as those described above with respect to FIG. 15.

The exemplary method for color calibrating exemplary marking systems described below with respect to FIG. 19 may use measured spectral information received from one or more Fabry-Perot array sensor embodiments. For example, a color stabilization process may receive measured spectral information from one or more Fabry-Perot array sensor embodiments that measure spectral information from toned patches on a photoreceptor belt, as well as one or more Fabry-Perot array sensor embodiments that measure spectral information from toned patches on a non-photosensitive output substrate. In this manner, an exemplary color stabilization process may obtain and make use of spectral information available from photoreceptor-based toned patch reflections and/or paper-based toned patch reflections, thereby maximizing spectral information available to support the color stabilization process.

As shown in FIG. 19, operation of the method begins at step S1902 and proceeds to step S1904.

In step S1904, the color calibration processor may determine whether one or more Fabry-Perot array sensors should be reconfigured based, for example, upon the range and resolution of spectral information desired by a color calibration processor to support a color calibration process.

If, in step S1904, the color calibration processor determines that reconfiguration of the Fabry-Perot array sensor is required, operation of the method continues to step S1906.

In step 1906, the Fabry-Perot array may be reconfigured by, for example, any one or all of the methods described above, with respect to FIGS. 12, 13 and 15. Once the Fabry-Perot array reconfiguration process is complete, operation of the method continues to step S1908.

If, in step 1904, the color calibration processor determines that reconfiguration of the Fabry-Perot array sensor is not required, operation of the method continues directly to step S1908.

In step S1908, a desired image pitch may be formed in a first area of the photoreceptor unit, which is an image area. Operation of the method continues to step S1910.

In step S1910, which may be substantially simultaneous with step S1908, a toned patch pattern containing data for generating one or more toned patches may be retrieved from a stored memory and provided to a marking engine. Operation of the method continues to step S1912.

In step S1912, the marking engine may produce a toned patch upon a photoreceptor belt 13 based upon the toned patch pattern retrieved from storage. Each toned patch pattern may include one or more toned patches, such as those discussed above in connection with FIG. 11. In some embodiments, and/or for some types of color calibration, it should be appreciated that the toned patch pattern may include only a single toned patch. For example, the toned patch could include a single mixture of color, and a measured reflectance value of the toned patch may be used to develop a calibration value that may be applied by the marking engine for that color. Calibrations for other colors could be performed separately with other toned patches on the same, or in subsequent, belt cycles. Operation of the method continues to step S1914.

In step S1914, generated patches upon the photoreceptor belt 13, and/or upon an output substrate to which a generated has been transferred, are illuminated and a reflectance value for each toned patch is measured for each of the one or more illumination wavelengths, and made available to a calibration processor. Reflectance values measured by each of the respective Fabry-Perot array sensors may also be stored. Such measured reflectance values may be measured by one or more of the Fabry-Perot array sensor embodiments described above. Therefore, the measured reflectance values may include reflectance values measured from toned patches on a photoreceptor belt and/or reflectance values measured from toned patches on an output substrate. Operation of the method continues to step S1916.

In step S1916, desired reflectance values for each of the one or more patches disposed upon the photoreceptor belt 13 for each illumination wavelength may be retrieved from memory storage and made available to a calibration processor. Each toned patch pattern may include separate desired reflectance values for one or more of the Fabry-Perot array sensor embodiments described above. Therefore, desired reflectance values may include for each toned patch pattern, desired reflectance values for measurements taken from a photoreceptor belt 13 in response to illumination wavelengths outside the photosensitive response range of the photoreceptor belt 13, as well as desired reflectance values for measurements taken from various output substrates, e.g., different types of plastic sheet, different types of paper sheet, in response to each of the illumination wavelengths and or bands of wavelengths used, including white light. Operation of the method continues to step S1918.

In step S1918, the calibration processor may determine a difference between retrieved desired reflectance values for each toned patch and the corresponding measured reflectance value measured for each toned patch for each illumination wavelength, and/or band of wavelengths, in step S1910. Operation of the method continues to step S1920.

In step S1920, the calibration processor may generate marking engine calibration data, e.g. a TRC or LUT, for each toner color that the marking engine uses. For example, a CMYK marking engine may have four TRCs or LUTs. Operation of the method continues to step S1922.

In step S1922, the calibration data generated in step S1914 is applied to the marking engine for use in adjusting the amount of ink output by primary color applying units to a photoreceptor in response to a requested process color. Operation of the method continues to step S1924.

In step S1924, the generated marking engine calibration data may be stored in a memory store so that the calibration data may be later retrieved and used in subsequent marking operations, e.g. after a marking system restart, to stabilize color variations. Operation of the method continues to step S1926.

In step S1926, the differences between retrieved desired reflectance values for each toned patch and the corresponding measured reflectance value measured for each toned patch for each illumination wavelength, determined in step S1918, may be compared against a threshold value. Such a threshold represents an acceptable deviation from desired reflectance values, and may, for example, be one or more user configurable values that may be associated with, for example, one or more toned patch patterns and/or one or more desired reflectance values. If the difference is greater than a predetermined threshold, the method continues to step S1904 to repeat the calibration process. However, if the difference is less than or equal to a predetermined threshold, the method continues to step S1928 where operation of the method ceases.

In the above exemplary method, color balanced TRCs may be generated using spectral information measured from toned patches or test images on the photoreceptor belt 13 and/or on an output substrate, such as an intermediate belt or paper, using one or more of the disclosed exemplary Fabry-Perot array sensor embodiments. For example, color-balanced TRCs may be accurately generated according to embodiments using, for example, mixed CMY gray patches and K patches in similar fashion to that employed by some prior art methods, such as that disclosed in Mestha et al., "Gray Balance Control Loop for Digital Color Printing Systems," Proceedings of $21^{st}$ International Conference on Digital Printing Technologies, NIP21, pp. 499-505 (2005), which is incorporated by reference in its entirety. Exemplary embodiments of the disclosed systems and methods may use measured spectral information from relatively few gray and black patches and/or any number of color patch spectral information obtained directly from the photoreceptor belt 13 and/or output substrate in order to construct TRCs more frequently, thus reducing time-dependent drifts in performance.

From the foregoing description it will be appreciated that the exemplary embodiments of the disclosed systems and methods include a novel Fabry-Perot array sensor color stabilization process that allows spectral information values to be measured from toned patches on a marking system photoreceptor transfer device such as a photoreceptor belt 13, and/or from toned patches upon an output substrate. Exemplary embodiments allow measured spectral information values to be collected at a higher frequency and improved accuracy for use in supporting color stabilization processes. The embodiments disclosed above and illustrated in the drawings represent only a few of the many ways of implementing the disclosed Fabry-Perot array sensor system and methodology for implementing color correction processes based upon an analysis of measured spectral information measured from toned patches upon a photoreceptor transfer device within a marking engine and/or from toned patches upon an output substrate. These exemplary embodiments are intended to be illustrative and in no way limiting regarding the manner by which such systems and methods may be implemented.

Spectral information values may be measured directly from a photoreceptor transfer device within the marking engine, such as a photoreceptor belt or drum. The sample rate may be limited only by the sensitivity of the light sensor and the time necessary to collect sufficient light for a reliable measurement. Therefore, spectral information values measured directly from a photoreceptor transfer device may be measured one or more times per rotation/revolution of the photoreceptor transfer device, if necessary, to support color stabilization. In paper based embodiments, spectral information values measured directly from an output substrate may be generated each time a new output substrate is produced.

The described color stabilization process may be implemented in any number of hardware/firmware/software modules and is not limited to the hardware/software architecture described or depicted above. It is to be understood that software modules supporting any selected hardware/firmware/software architecture process may be implemented in any desired computer language, and could be developed by one of ordinary skill in the computer and/or programming arts based on the functional description contained herein and the flow charts illustrated in the drawings.

Software modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Such software modules can be utilized separately or together to form a program product that can be implemented through signal-bearing media, including transmission media and recordable media.

The disclosed color stabilization process may accommodate any quantity and any type TRCs, LUTs, and/or any quantity and any type of data set files and/or databases or other structures containing stored toned patch calibration data, measured reflectance values, and/or intermediate data sets, such as differences between measured reflectance values and stored toned patch calibration data.

Output from the disclosed color stabilization process may be presented to a user in any manner using numeric and/or visual presentation formats. However, output may be presented only in the form of output images with improved color stabilization. Input from a user may be input in any manner accessible to a user, for example, a marking system control interface and/or a network connection to the marking system, and may be stored in any manner accessible to the color stabilization process for controlling user configurable data and/or thresholds and/or control parameters used in the color stabilization process.

Further, any references herein of software performing various functions generally refer to computer systems or processors performing those functions under software control. The computer system may alternatively be implemented by hardware or other processing circuitry. The various functions of the disclosed color stabilization process may be distributed in any manner among any quantity (for example, one or more) of hardware and/or software modules or units, computer or processing systems or circuitry, where the computer or processing systems may be disposed locally or remotely of each other and communicate via any suitable communications medium (for example, LAN, WAN, Intranet, Internet, hardwire, modem connection, wireless, etc.). The processes disclosed above and illustrated in the flow charts and diagrams may be modified in any manner that accomplishes the functions disclosed herein.

Toned patches are not limited to any particular color, color combination or shade of black or gray. Exemplary Fabry-Perot array sensors may be used to measure accurate reflectance values from any toned patch, including single-color patches, mixed-color patches and multi-separation image-on-image colors.

Sensor capabilities may include single or multiple Fabry-Perot array sensor devices mounted within a marking system to allow measured reflectance values to be generated from one or several locations within the marking system. If measured reflectance values are collected simultaneously, by multiple Fabry-Perot array sensor devices, these devices may preferably be light isolated, so that a measured reflectance value is in response to light emitted from the same Fabry-Perot array sensor device used to generate the measured reflectance value.

In exemplary embodiments, the voltage source used to drive illumination sources, for example LCLEDs, may be pulsed at a level above what is sustainable in a continuous current mode, thereby producing higher flux detection signals and allowing a toned patch to be interrogated in a shorter time period. Further, by integrating output of the light sensor over one or more illumination periods, enhanced signal to noise ratios can be achieved.

While the LEDs in exemplary embodiments, disclosed above, are turned on one at time in sequence, it will be appreciated that the system is not limited thereto. There may be measurement modes in which it is desirable to turn on more than one LED or other illumination source, simultaneously, on the same toned patch.

Toned patches may be discretely applied to a photoreceptor transfer device at any location outside the respective pitch areas. Further, embodiments disclosed above use toned patches as the means by which reflectance values are measured. In such a manner, color correction processes may be supported without interfering with image process flow. Toned patches may alternatively be applied as, for example, test images within pitches. Reflectance values for such test images may be generated from one or more exemplary Fabry-Perot array sensors, such as a Fabry-Perot array sensor positioned over the pitch area of the photoreceptor transfer device. Such test images may be transferred to an output substrate or removed from the photoreceptor transfer device without being transferred to an output substrate. Further, such test images may be transferred to an output substrate and exemplary Fabry-Perot array sensor, such as a Fabry-Perot array sensor positioned over the image area of the output substrate, may generate spectral information values based upon the toned patches on the output substrate in addition to, or in place of, measured spectral information values of toned patches measured from the photoreceptor transfer device.

The use of color calibration processes using toned patches and/or test images and one or more Fabry-Perot array sensors for measuring spectral information from patches and/or test images on a photoreceptor unit and/or on an output substrate may be initiated at any time, either manually or automatically. Such color calibration processes may be executed simultaneously with image generation or as separately executed operations. Regardless of when such color calibration processes are performed, reconfiguration of Fabry-Perot array sensor Fabry-Perot cell gap distances are preferably set before, after or between spectral imaging operations supporting such color calibration processes. Further, in a fully automated system, reconfiguration of Fabry-Perot array sensor Fabry-Perot cell gap distances could be adjusted based on image content.

Figure 3:
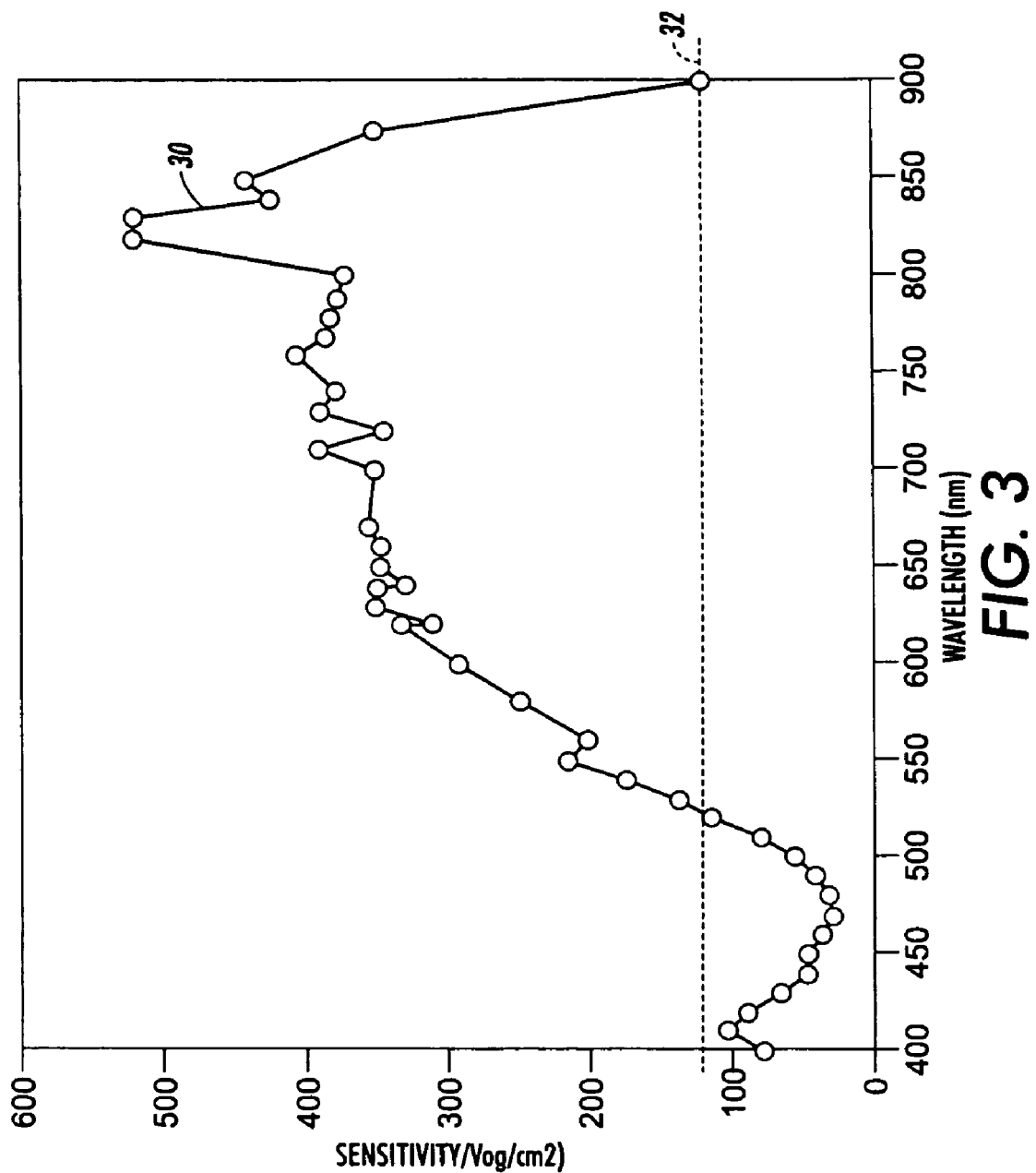
FIG. 3 is a graphical plot of the spectral sensitivity of an exemplary photoreceptor belt.

In the disclosed paper-based Fabry-Perot array sensor embodiments and related color stabilization processes, illumination wavelengths used to illuminate toned patches are not limited to any specific wavelengths. In the disclosed photoreceptor based Fabry-Perot array sensor embodiments and related color stabilization methods, the illumination wavelengths are not limited to any specific wavelengths, but may preferably include only wavelengths that are outside of the sensitivity range of the photoreceptor transfer device and, therefore do not result in ghosting. Wavelengths may be selected based upon the spectral response curve of the respective photoreceptor transfer device. The spectral response shown in FIG. 3 is exemplary only. Similar spectral response curves for other photoreceptor transfer devices are commercially available and/or may be easily obtained and, therefore, wavelengths for which the photoreceptor transfer device is only nominally responsive may be easily determined.

The wet etching process disclosed above with respect to FIGS. 9A and 9B may be performed using any number of mask patterns, mask materials, and etching solutions. The technique is not limited to the exemplary Fabry-Perot cell designs disclosed.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method of calibrating a marking engine that includes a photoreceptor transfer device having at least a first area on a surface of the photoreceptor transfer device, the at least first area receiving at least one color of marking material that is an image, the photoreceptor transfer device conveying the marking material to at least one of another transfer device or an output substrate, the method comprising:

configuring Fabry-Perot cells within a Fabry-Perot array to form a desired light filter pattern;

disposing at least one toned patch in a second area of the photoreceptor transfer device, the second area being different from and not overlapping the first area and the second area being disposed at a margin area located on the surface of the photoreceptor transfer device;

transferring the at least one toned patch or the image to the output substrate;

illuminating the at least one toned patch or the image on the output substrate;

filtering light reflected from the at least one toned patch or the image through the Fabry-Perot array;

measuring the filtered light received from different Fabry-Perot cells within the Fabry-Perot array to obtain measured spectral information values for the at least one toned patch or the image in response to the illumination; and performing a color calibration of the marking engine for use in a marking operation based on the measured spectral information values.

2. The method of claim 1, wherein configuring the Fabry-Perot cells into a desired light filter pattern comprises setting the Fabry-Perot cells within the Fabry-Perot array with a desired cell gap.

3. The method of claim 1, wherein configuring the Fabry-Perot cells into a desired light filter pattern comprises setting the Fabry-Perot cells within the Fabry-Perot array so that cell gaps across the array in selected direction form a desired slope.

4. The method of claim 1, wherein configuring the Fabry-Perot cells into a desired light filter pattern comprises setting a subset of the Fabry-Perot cells within the Fabry-Perot array to a common gap width.

5. The method of claim 1, wherein configuring the Fabry-Perot cells into a desired light filter pattern comprises setting Fabry-Perot cells within the Fabry-Perot array based upon the image in the first area or the at least one toned patch in the second area.

6. The method of claim 1, wherein configuring the Fabry-Perot cells into a desired light filter pattern comprises setting the Fabry-Perot cells within the Fabry-Perot array in a fixed, immovable configuration.

7. The method of claim 1, wherein disposing the at least one toned patch comprises:

retrieving at least one stored toned patch pattern stored in a memory device for the at least one toned patch; and disposing the at least one toned patch on the photoreceptor transfer device based upon the retrieved at least one toned patch pattern.

8. The method of claim 7, wherein disposing the at least one toned patch further comprises disposing the at least one toned patch separately from each primary color used by the marking engine.

9. The method of claim 1, wherein the at least one toned patch comprises at least one of a single-color patch, a mixed-color patch, or a multi-separation image-on-image color patch.

10. The method of claim 1, wherein illuminating the at least one toned patch or the image comprises illuminating the at least one toned patch or the image on the output substrate in sequence with each of a plurality of illumination wavelengths.

11. The method of claim 10, wherein the plurality of illumination wavelengths include wavelengths in the visible spectrum.

12. The method of claim 10, wherein the plurality of illumination wavelengths include wavelengths outside the visible spectrum.

13. The method of claim 1, wherein performing the calibration comprises:

determining a tone reproduction curve for a pitch based on the measured spectral information values; and applying the tone reproduction curve to the respective pitch.

14. A system comprising:

a photoreceptor transfer device that includes a plurality of first areas receiving at least one color of marking material that is an image and conveying the marking material to an output substrate;

a first storage device adapted to store at least one toned patch pattern for at least one toned patch;

a marking engine that marks a desired image in a first area and marks at least one toned patch in a second area of the photoreceptor transfer device based on the stored toned patch pattern, the second area being different from and not overlapping the first area;

at least one illumination source that illuminates the at least one toned patch or the image on the output substrate with an illumination wavelength;

a Fabry-Perot array sensor that measures a spectral information for the at least one toned patch or the image illuminated on the output substrate to obtain spectral information values for the at least one toned patch or the image in response to illumination of the at least one toned patch or the image from the at least one illumination source; and a calibration processor that performs a color calibration of the marking engine for use in a marking operation based on the spectral information values.

15. The system of claim 14, wherein the calibration processor determines at least one tone reproduction curve based on the spectral information values.

16. The method of claim 14, wherein illuminating the at least one toned patch or the image comprises illuminating the at least one toned patch or the image on the output substrate in sequence with each of a plurality of illumination wavelengths.

17. The method of claim 16, wherein the plurality of illumination wavelengths include wavelengths in the visible spectrum.

18. The method of claim 16, wherein the plurality of illumination wavelengths include wavelengths outside the visible spectrum.

19. The system of claim 14, the Fabry-Perot array sensor further comprising:

an illumination controller that controls illumination of the at least one illumination source.

20. The system of claim 14, the Fabry-Perot array sensor further comprising a light sensing array that measures filtered light received from Fabry-Perot cells within the Fabry-Perot array to obtain measured spectral information values for the at least one toned patch or the image in response to the illumination.

21. The system of claim 14, wherein Fabry-Perot cells within the Fabry-Perot array are set in a fixed, immovable configuration.

22. The system of claim 14, the Fabry-Perot array sensor further comprising
a reconfiguration controller that configures Fabry-Perot cells within the Fabry-Perot array to form a desired light filter pattern.

23. The system of claim 22, wherein the reconfiguration controller configures the Fabry-Perot cells within the Fabry-Perot array into a desired light filter pattern based upon marking material in at least one of the plurality of first areas or the second area.

24. The system of claim 14, the Fabry-Perot array sensor further comprising a spectral filtering processor that provides the spectral information to a marking system controller based upon the measured spectral values received from a light sensing array and Fabry-Perot array filter configuration information received from a reconfiguration controller.

25. An image forming device comprising the system of claim 14.

26. A xerographic image forming device comprising the system of claim 14.

* * * * *